(12) United States Patent
Farley et al.

(10) Patent No.: US 12,430,439 B2
(45) Date of Patent: Sep. 30, 2025

(54) LCS TRUST SYSTEM

(71) Applicant: Dell Products L.P., Round Rock, TX (US)

(72) Inventors: Douglas Lang Farley, Round Rock, TX (US); Srinivas Giri Raju Gowda, Fremont, CA (US); Eugene David Cho, Austin, TX (US); Trevor Christian Cockrell, Hutto, TX (US); David Craig Lawson, Richardson, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 18/418,462

(22) Filed: Jan. 22, 2024

(65) Prior Publication Data

US 2025/0238514 A1 Jul. 24, 2025

(51) Int. Cl.
*G06F 21/57* (2013.01)
(52) U.S. Cl.
CPC .................................. *G06F 21/57* (2013.01)
(58) Field of Classification Search
CPC ....................................................... G06F 21/57
See application file for complete search history.

(56) References Cited

U.S. PATENT DOCUMENTS

2022/0019667 A1* 1/2022 Sood ..................... G06F 21/57

FOREIGN PATENT DOCUMENTS

KR 20070020520 A * 2/2007 ............. G06F 21/53

* cited by examiner

*Primary Examiner* — Joseph P Hirl
*Assistant Examiner* — Aayush Aryal
(74) *Attorney, Agent, or Firm* — Joseph Mencher

(57) ABSTRACT

An LCS trust system includes resource devices including respective resource device pTPMs, and an SCP device including an SCP device pTPM and providing a resource management system with a resource management system vTPM. The resource management system uses the resource management system vTPM to establish a first trust relationship with the SCP device via the SCP device pTPM, and respective second trust relationships with each of the resource devices via their respective resource device pTPMs. The resource management system the uses a subset of the resource devices to provide an LCS that includes an LCS vTPM and that uses the LCS vTPM to establish a respective third trust relationship with each of the subset of the resource devices via their respective resource device pTPMs. As such, a chain of trust is provided for the LCS that is based at least upon the first, respective second, and respective third trust relationships.

20 Claims, 22 Drawing Sheets

LCS TRUST SYSTEM

BACKGROUND

The present disclosure relates generally to information handling systems, and more particularly to providing for trusted operation of a Logically Composed System (LCS) provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and their components, are often used to provide applications, programs, and/or others workloads known in the art. For a conventional workload performed by server devices and their components, "trusted" performance of that workload may be established via trust relationships between the server devices and/or components that will perform that workload. To provide a specific example, a Trusted Platform Module (TPM) may be provided in a server device and may be configured to perform a variety of TPM operations known in the art (e.g., TPM measurements) to verify that physical hardware (e.g., processing systems, memory systems, and/or other physical hardware in the server device that was configured during manufacture of the server device to have its authenticity attested to) and software/firmware provided thereon (e.g., a Basic Input/Output System BIOS, operating system, and/or other software/firmware that may be provided by the server device and that was configured during manufacture of the server device to have its authenticity attested to) in order to verify that workloads performed on that server device and/or by its components can be trusted.

However, server devices and their components may be used to provide Logically Composed Systems (LCSs) to users that include logical systems whose functionality is provided by components in one or more server devices, with can present issues with regard to the trusted operations of such LCSs. For example, the dynamic and fluid nature of the server devices and/or components that may be used to provide an LCS and perform workloads via that LCS can "break" any of the trust relationships (a "chain of trust") that may have previously been established between the server devices and/or their components that were initially configured to provide that LCS and perform its workloads, as the server devices and/or components used to provide an LCS may change during the lifetime of the LCS.

Accordingly, it would be desirable to provide an LCS trust system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: establish, using a resource management engine virtual Trusted Platform Module (vTPM) that is included in the resource management engine, a first trust relationship with a first System Control Processor (SCP) device that includes at least a portion of the processing system that provides the resource management engine via a first SCP device physical Trusted Platform Module (pTPM) that is included in the first SCP device; establish, using the resource management engine vTPM, a respective second trust relationship with each of a plurality of first resource devices via a respective first resource device pTPM that is included in that first resource device; and provide, using a first subset of the plurality of first resource devices, a Logically Composed System (LCS) that includes an LCS vTPM and that is configured to: establish, using the LCS vTPM, a respective third trust relationship with each of the first subset of the plurality of first resource devices via the respective first resource device pTPM in that first resource device in order to provide a first chain of trust for the LCS that is based at least upon: the first trust relationship established between the resource management system and the first SCP device; the respective second trust relationships between the resource management system and each of the first subset of the plurality of first resource devices; and the respective third trust relationship between each of the first subset of the plurality of first resource devices and the LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
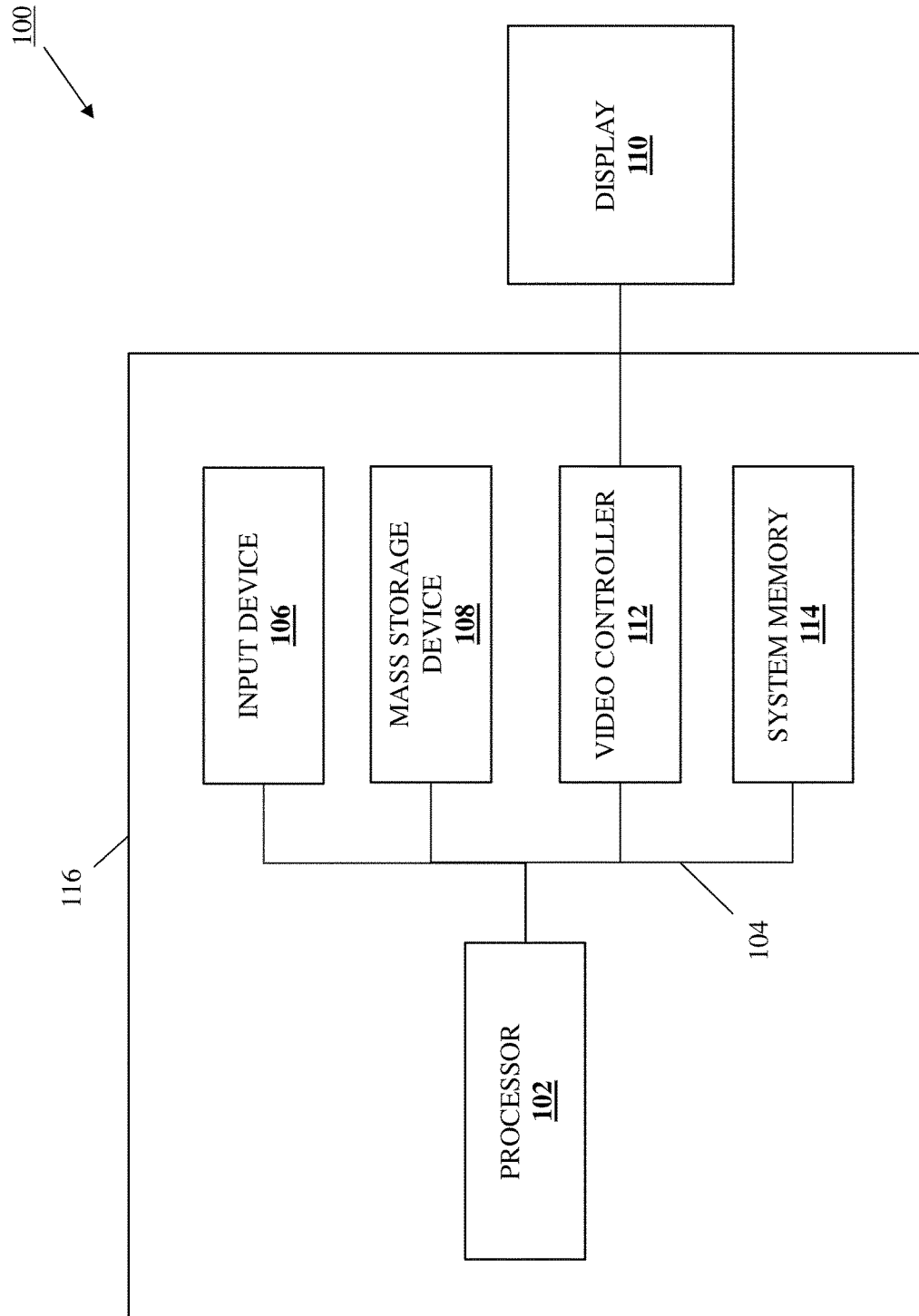
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) trust systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
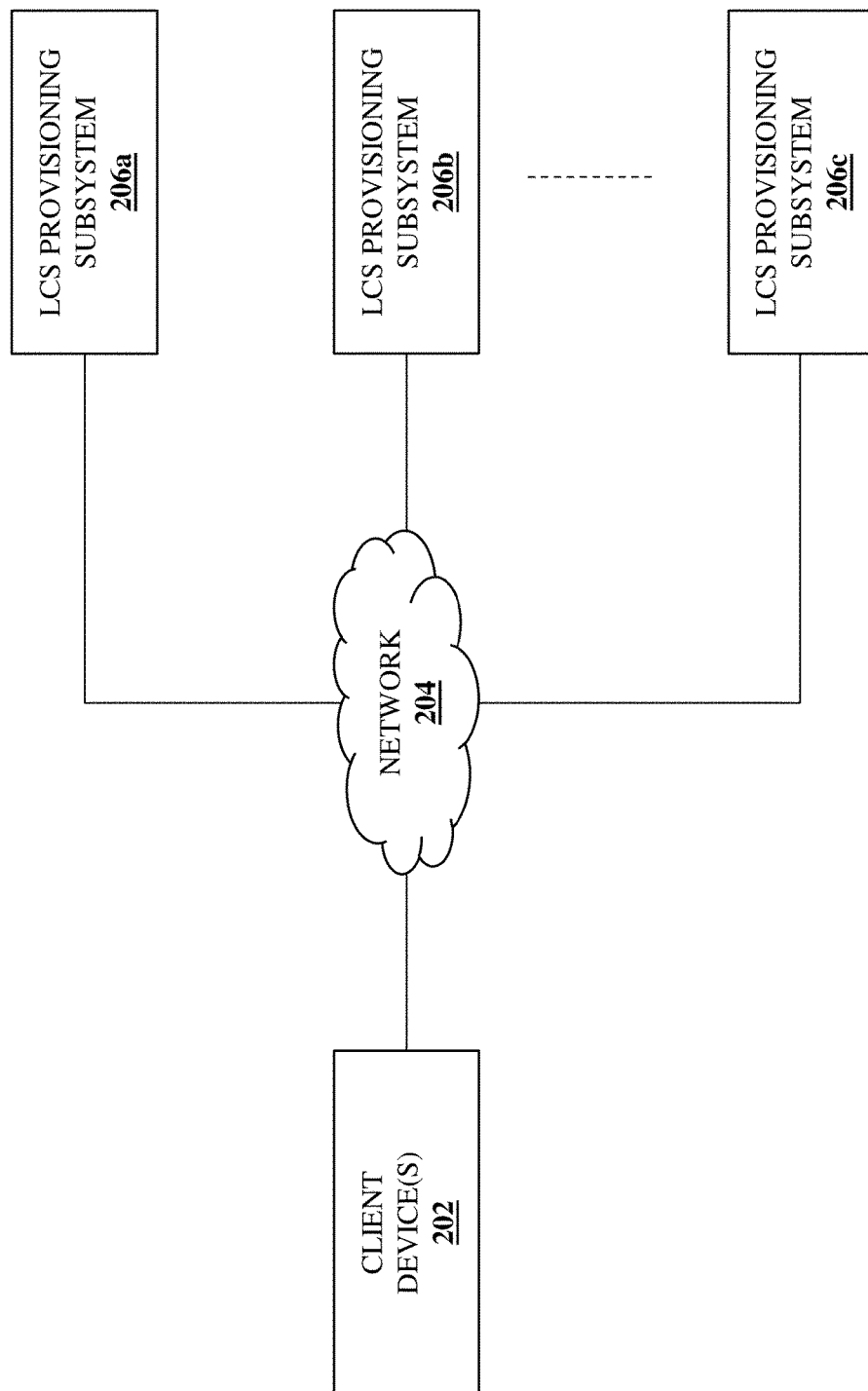
FIG. 2 is a schematic view illustrating an embodiment of an LCS provisioning system.

With reference to FIG. 2, an embodiment of a Logically Composed System (LCS) provisioning system 200 is illustrated that may be utilized with the LCS trust systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
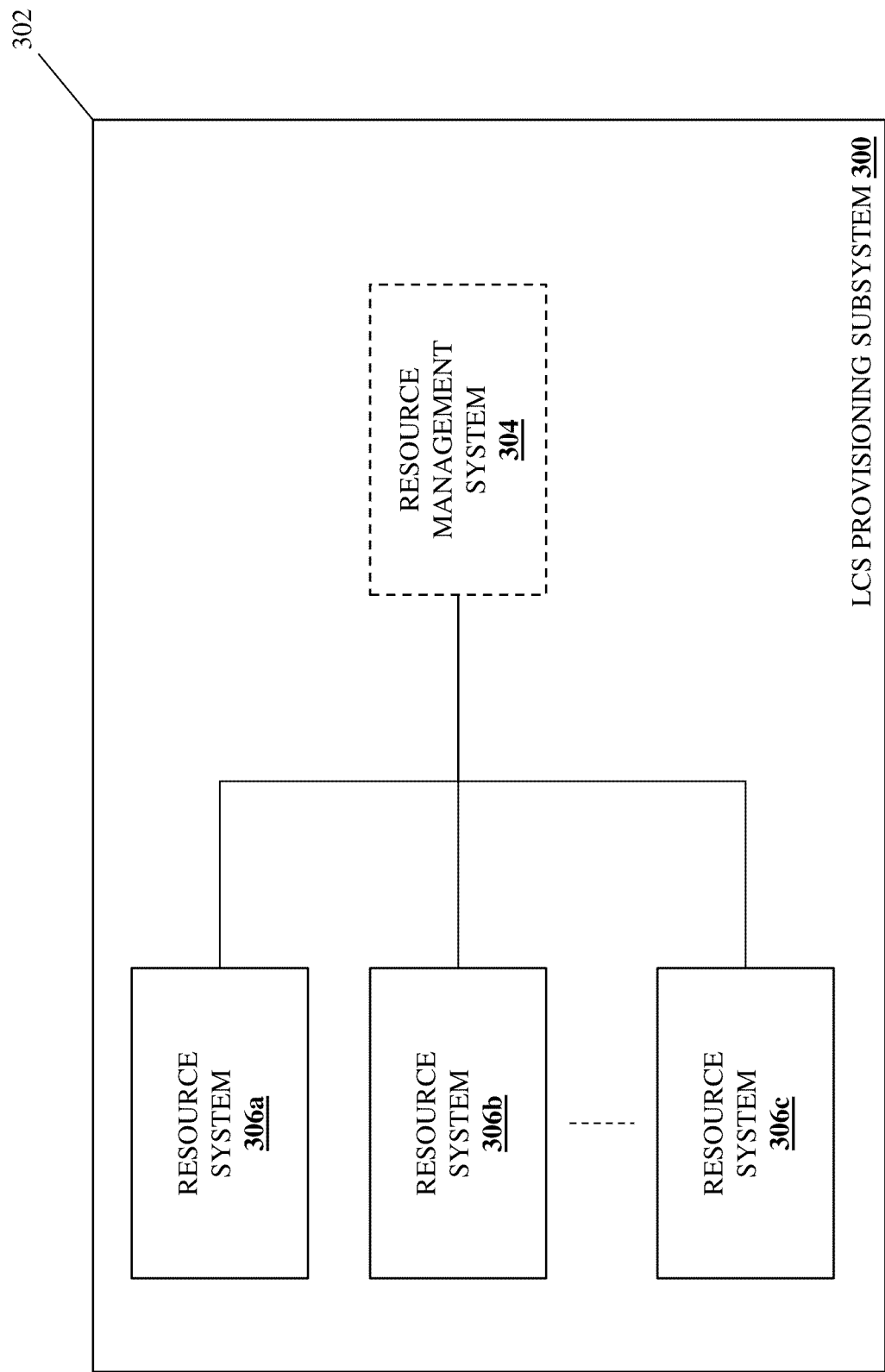
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, LCS trust functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
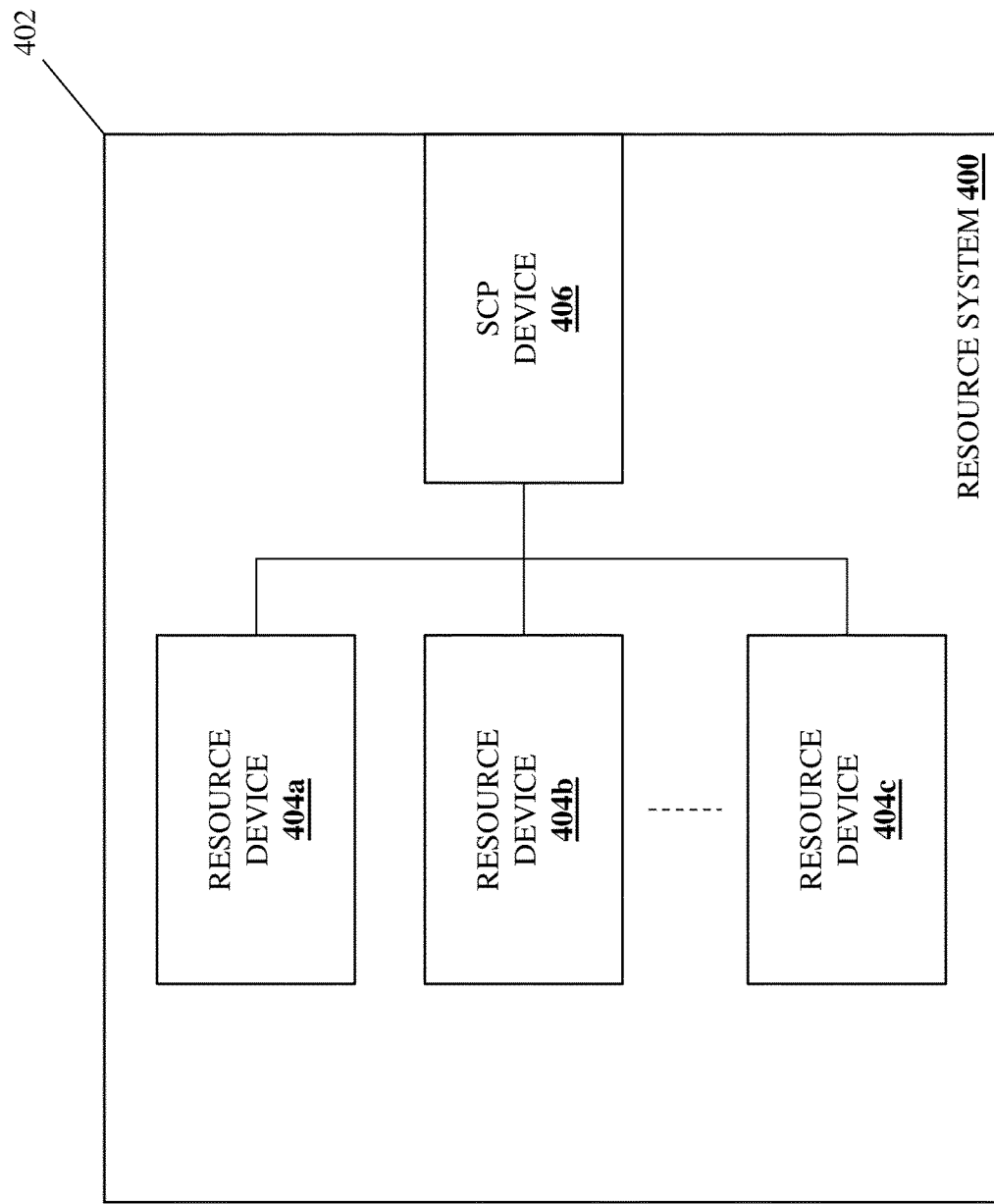
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM)

devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406.

However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
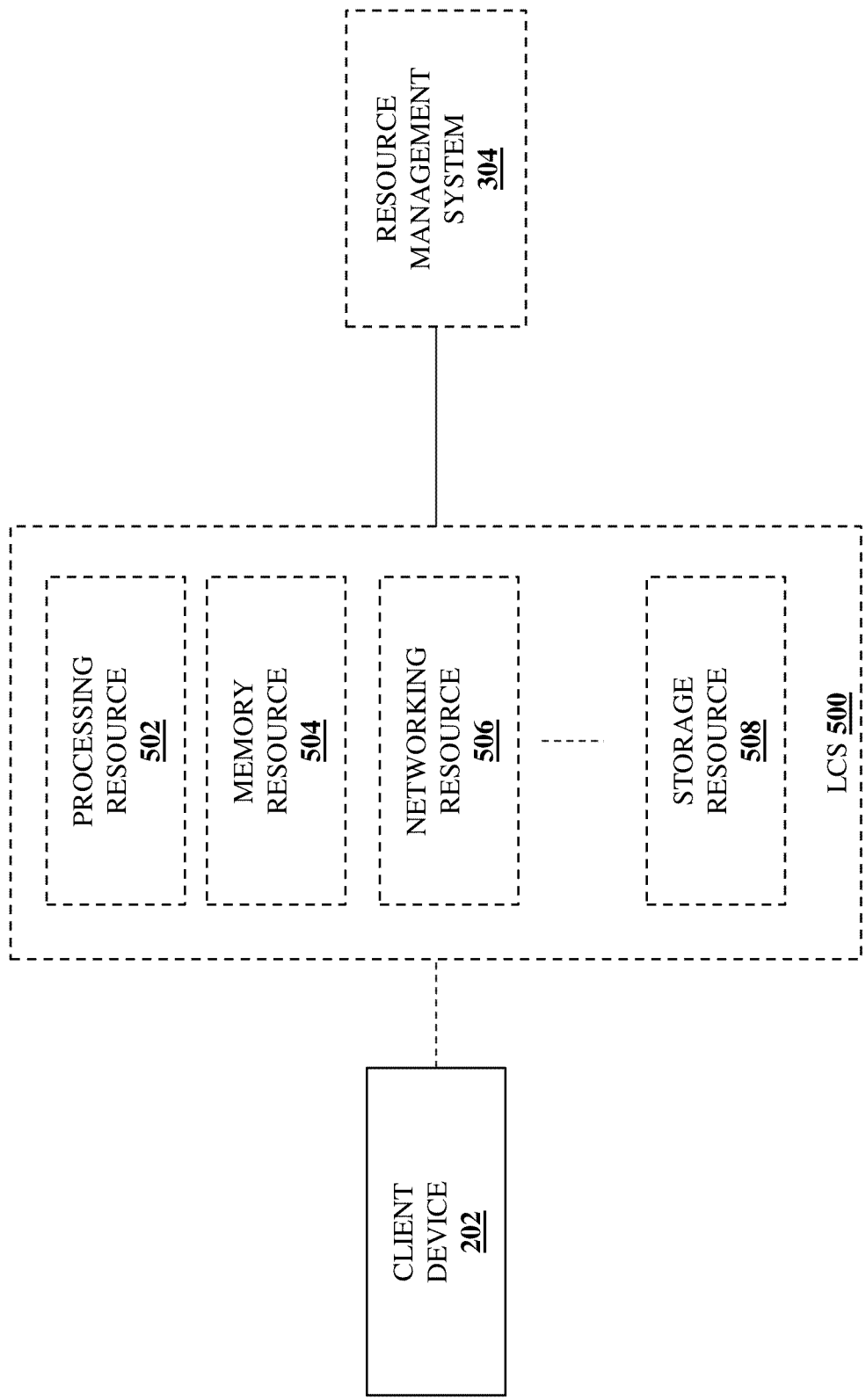
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
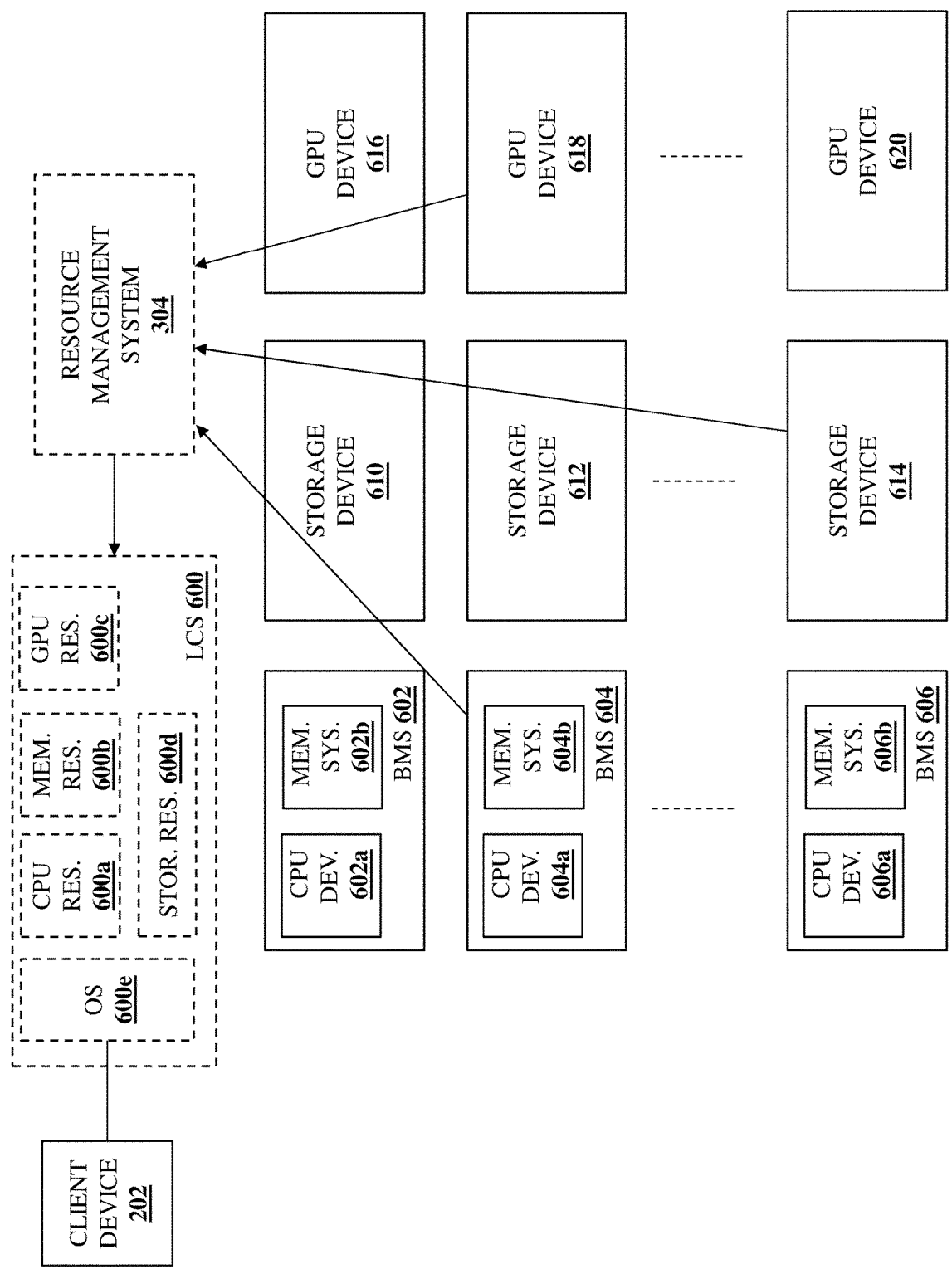
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

However, as discussed above, the dynamic and fluid nature of the resource systems and/or resource devices that may be used to provide an LCS and perform workloads via that LCS can "break" any the trust relationships (a "chain of trust") that may have previously been established between the resource systems and/or resource devices that were initially configured to provide that LCS and perform its workloads, as resource systems and/or resource devices used to provide an LCS may change during the lifetime of the LCS. As such, the inventors of the present disclosure have developed an LCS trust system that addresses such issues.

Figure 7:
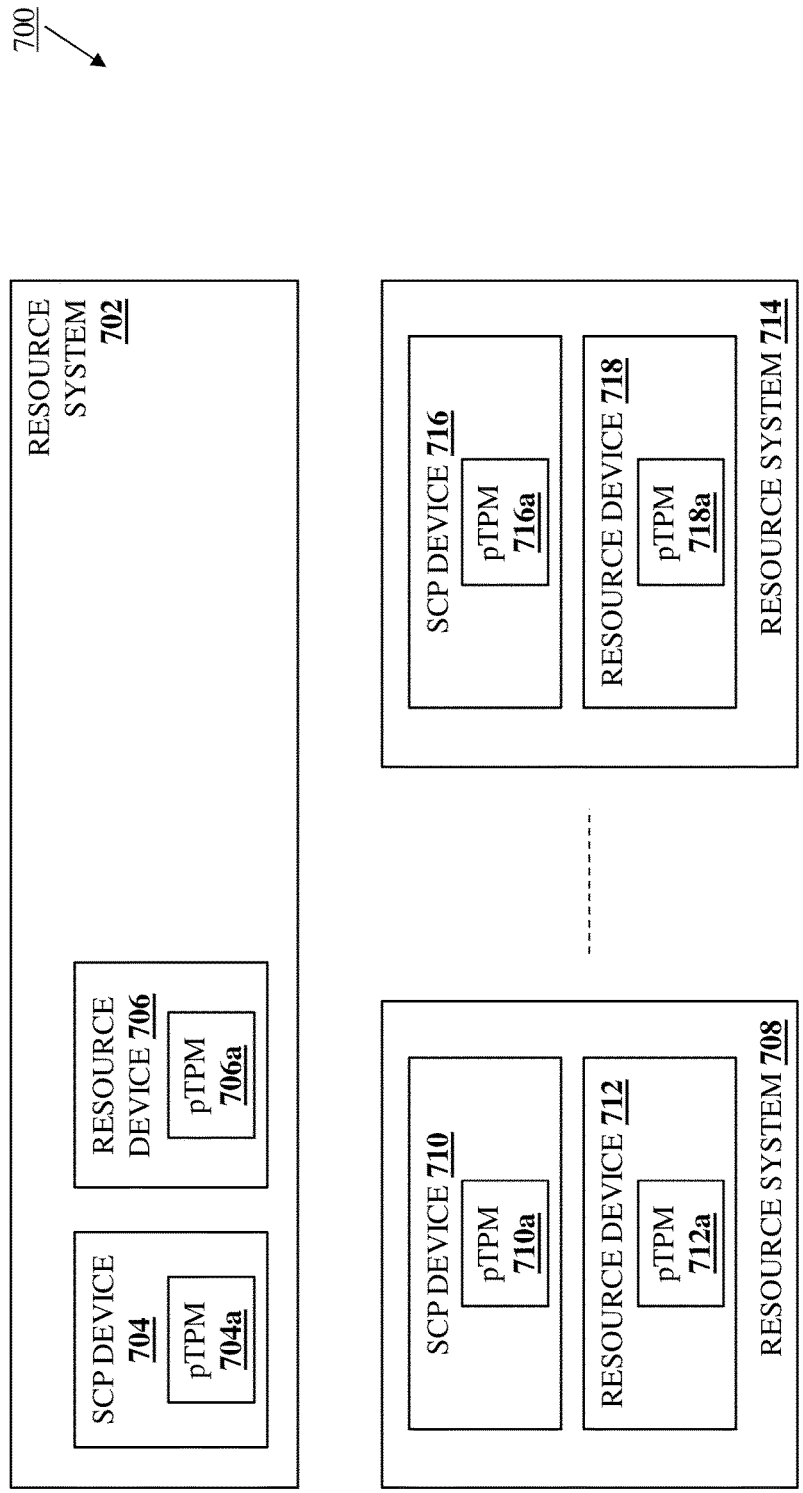
FIG. 7 is a schematic view illustrating an embodiment of the LCS provisioning subsystem of FIG. 3 that may be used to provide the LCS trust system of the present disclosure.

Referring now to FIG. 7, an embodiment of an LCS provisioning subsystem 700 is illustrated that may be provided by the LCS provision subsystem 300 discussed above with reference to FIG. 3, and that may provide the LCS trust system of the present disclosure. In the illustrated embodiment, the LCS provisioning subsystem 700 includes a resource system 702 that may be provided by any of the resource systems 306a-306c in the LCS provision subsystem 300 discussed above with reference to FIG. 3 and/or the resource system 400 discussed above with reference to FIG. 4, and in specific examples may be provided by a BMS such as the BMWs 602-606 discussed above with reference to FIG. 6. In the illustrated embodiment, the resource system 702 includes an SCP device 704 that may be provided by the SCP device 406 in the resource system 400 discussed above with reference to FIG. 4.

In an embodiment, the SCP device 406 may include an SCP processing system (not illustrated, but which may be similar to the processor 102 discussed above with reference to FIG. 1) and an SCP memory system (not illustrated, but which may be similar to the memory 114 discussed above with reference to FIG. 1) that includes instructions that, when executed by the SCP processing system, cause the SCP processing system to provide an SCP engine that is configured to perform the functionality of the SCP device 704 described below. As illustrated, the SCP device 704 may include (or otherwise be provided with) a "physical" Trusted Platform Module (pTPM) 704a.

As will be appreciated by one of skill in the art in possession of the present disclosure, the pTPMs described herein are physically present with their corresponding hardware and are expected to be so for the life of that hardware. As such, the pTPMs described below may be provided by separate or "discrete" TPMs may be provided by discrete TPM chips (e.g., silicon chips) that are only configured to perform TPM functionality, "integrated" TPMs that may be integrated into chips (e.g., silicon chips) that perform TPM functionality as well as other non-TPM functionality, "firmware" TPMs that are provided via a protected portion of a chip (e.g., a silicon chip), and/or other pTPMs that one of skill in the art in possession of the present disclosure would recognize as not being provided "on-demand" like the virtual TPMs (vTPMs) discussed below. As will be appreciated by one of skill in the art in possession of the present disclosure, the pTPM 704a may include an pTPM endorsement key (e.g., a combination of a key and certificate that verifies that key) that may be used as a "trust anchor" for the identity of the SCP device 704, Platform Configuration Registers (PCRs) that may be used to verify the integrity of state(s) of the SCP device 704, and/or any other pTPM components known in the art.

In the illustrated embodiment, the resource system 702 also includes a resource device 706 that may be provided by any of the resource devices 404a-404c in the resource system 400 discussed above with reference to FIG. 4, and while only a single resource device 706 is illustrated in FIG. 7 to provide clarity in the illustrations and discussions provided below, one of skill in the art in possession of the present disclosure will appreciate how the resource system 702 may include a plurality of resource devices that are substantially similar to the resource device 706 while remaining within the scope of the present disclosure as well. In many of the specific examples provided below, the resource device 706 is provided by a processing system (e.g., a "host" processing system like the CPUs 602a-606a in the BMSs 602-606, respectively, described below with reference to FIG. 6), but one of skill in the art in possession of the present disclosure will appreciate how any of a variety of resource devices may be provided in place of, or in addition to, the processing system described below while remaining within the scope of the present disclosure as well.

As illustrated, the resource device 706 may include (or otherwise be provided with) a pTPM 706a that may be provided by any of the pTPMs discussed above. As will be appreciated by one of skill in the art in possession of the present disclosure, the pTPM 706a may include an pTPM endorsement key (e.g., a combination of a key and certificate that verifies that key) that may be used as a "trust anchor" for the identity of the resource device 706, Platform Configuration Registers (PCRs) that may be used to verify the integrity of state(s) of the resource device 706, and/or any other pTPM components known in the art.

In the illustrated embodiment, the LCS provisioning subsystem 700 also includes resource systems 708 and up to 714 that may each be provided by any of the resource systems 306a-306c in the LCS provision subsystem 300 discussed above with reference to FIG. 3 and/or the resource system 400 discussed above with reference to FIG. 4, and in specific examples may be each be provided by a BMS such as the BMSs 602-606 discussed above with reference to FIG. 6. In the illustrated embodiment, the resource system 708 includes an SCP device 710 that may be provided by the SCP device 406 in the resource system 400 discussed above with reference to FIG. 4. As illustrated, the SCP device 710 may include (or otherwise be provided with) a pTPM 710a that may be provided by any of the pTPMs discussed above. As will be appreciated by one of skill in the art in possession of the present disclosure, the pTPM 710a may include an pTPM endorsement key (e.g., a combination of a key and certificate that verifies that key) that may be used as a "trust anchor" for the identity of the SCP device 710, Platform Configuration Registers (PCRs) that may be used to verify the integrity of state(s) of the SCP device 710, and/or any other pTPM components known in the art.

In the illustrated embodiment, the resource system 710 also includes a resource device 712 that may be provided by any of the resource devices 404a-404c in the resource system 400 discussed above with reference to FIG. 4, and while only a single resource device 712 is illustrated in FIG. 7 to provide clarity in the illustrations and discussions provided below, one of skill in the art in possession of the present disclosure will appreciate how the resource system 708 may include a plurality of resource devices that are substantially similar to the resource device 712 while remaining within the scope of the present disclosure as well. In many of the specific examples provided below, the resource device 712 is provided by a processing system (e.g., a "host" processing system like the CPUs 602a-606a in the BMSs 602-606, respectively, described below with reference to FIG. 6), but one of skill in the art in possession of the present disclosure will appreciate how any of a variety of resource devices may be provided in place of, or in addition to, the processing system described below while remaining within the scope of the present disclosure as well.

As illustrated, the resource device 712 may include (or otherwise be provided with) a pTPM 712a that may be provided by any of the pTPMs discussed above. As will be appreciated by one of skill in the art in possession of the present disclosure, the pTPM 712a may include an pTPM endorsement key (e.g., a combination of a key and certificate that verifies that key) that may be used as a "trust anchor" for the identity of the resource device 712, Platform Configuration Registers (PCRs) that may be used to verify the integrity of state(s) of the resource device 712, and/or any other pTPM components known in the art.

In the illustrated embodiment, the resource system 714 includes an SCP device 716 that may be provided by the SCP device 406 in the resource system 400 discussed above with reference to FIG. 4. As illustrated, the SCP device 716 may include (or otherwise be provided with) a pTPM 716a that may be provided by any of the pTPMs discussed above. As will be appreciated by one of skill in the art in possession of the present disclosure, the pTPM 716a may include an pTPM endorsement key (e.g., a combination of a key and certificate that verifies that key) that may be used as a "trust anchor" for the identity of the SCP device 716, Platform Configuration Registers (PCRs) that may be used to verify the integrity of state(s) of the SCP device 716, and/or any other pTPM components known in the art.

In the illustrated embodiment, the resource system 714 also includes a resource device 718 that may be provided by any of the resource devices 404a-404c in the resource system 400 discussed above with reference to FIG. 4, and while only a single resource device 718 is illustrated in FIG. 7 to provide clarity in the illustrations and discussions provided below, one of skill in the art in possession of the present disclosure will appreciate how the resource system 714 may include a plurality of resource devices that are substantially similar to the resource device 718 while remaining within the scope of the present disclosure as well. As illustrated, the resource device 718 may include (or otherwise be provided with) a pTPM 718a that may be provided by any of the pTPMs discussed above. As will be appreciated by one of skill in the art in possession of the present disclosure, the pTPM 718a may include an pTPM endorsement key (e.g., a combination of a key and certificate that verifies that key) that may be used as a "trust anchor" for the identity of the resource device 718, Platform Configuration Registers (PCRs) that may be used to verify the integrity of state(s) of the resource device 718, and/or any other pTPM components known in the art.

Figure 8:
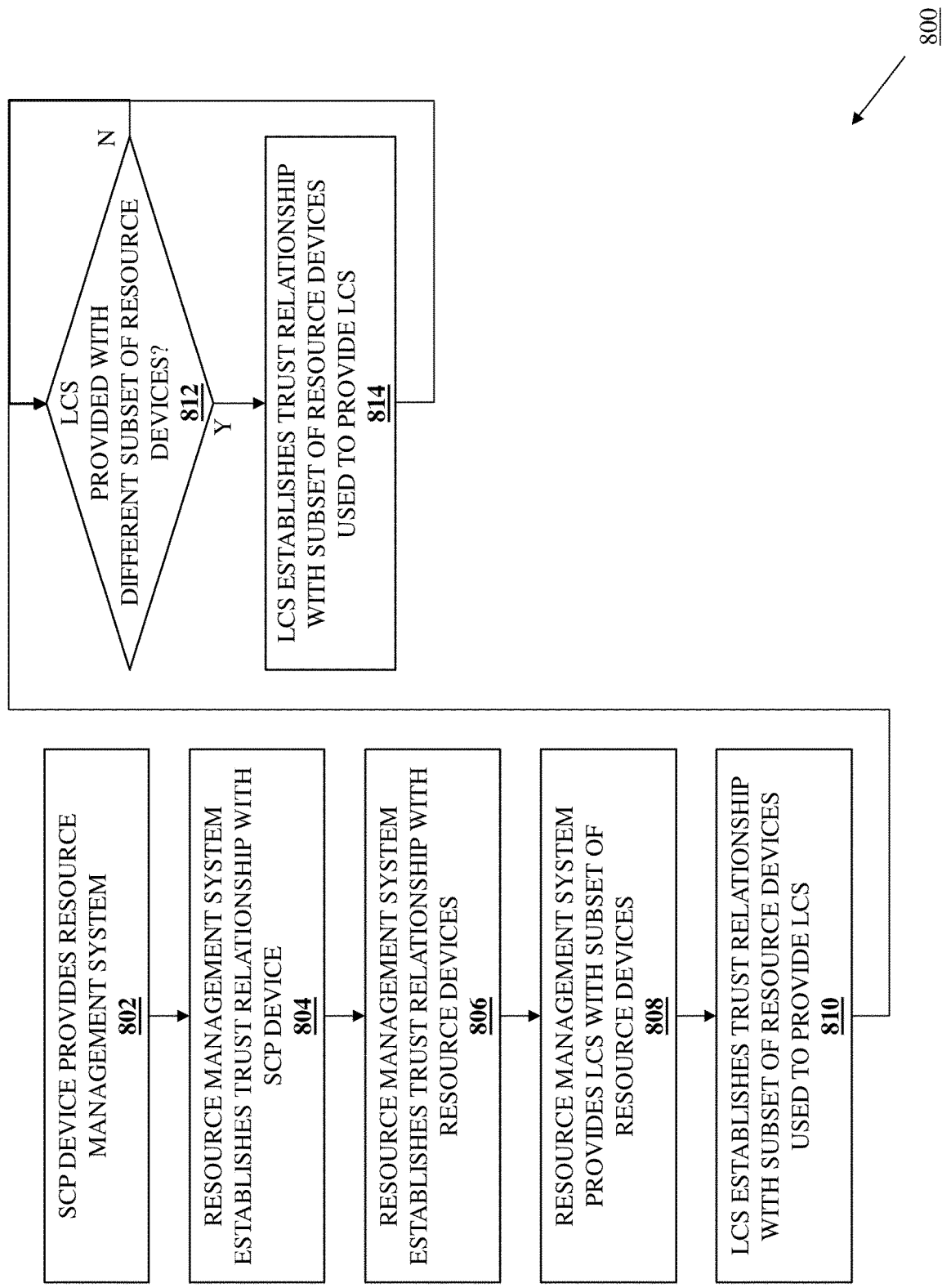
FIG. 8 is a flow chart illustrating an embodiment of a method for providing for trusted operation of an LCS.

Referring now to FIG. 8, an embodiment of a method 800 for providing for trusted operation of a Logically Composed System (LCS) is illustrated. As discussed below, the systems and methods of the present disclosure provide a resource management system with a vTPM that allows it to establish trust relationships with the device(s) that provide it using respective pTPM(s) in those device(s), as well as with resource devices it uses to provide LCSs using respective pTPM(s) in those resource device(s), and the resource management system then uses subsets of those resource devices to provide an LCS with a vTPM that allows that LCS to establish trust relationships with respective dTPMs in each of the subset of resource devices that provide it. For example, the LCS trust system of the present disclosure may include resource devices including respective resource device pTPMs, and an SCP device including an SCP device pTPM and providing a resource management system with a resource management system vTPM. The resource management system uses the resource management system vTPM to establish a first trust relationship with the SCP device via the SCP device pTPM, and respective second trust relationships with each of the resource devices via their respective resource device pTPMs. The resource management system the uses a subset of the resource devices to provide an LCS that includes an LCS vTPM and that uses the LCS vTPM to establish a respective third trust relationship with each of the subset of the resource devices via their respective resource device pTPMs. As such, a chain of trust is provided for the LCS that is based at least upon the first, respective second, and respective third trust relationships. As discussed below, the systems and methods of the present disclosure allow LCSs to be provided using different subsets of resource devices during its lifetime while dynamically recomposing a TPM hierarchy to maintain a chain of trust that ensures its trusted operation.

Figure 9A:
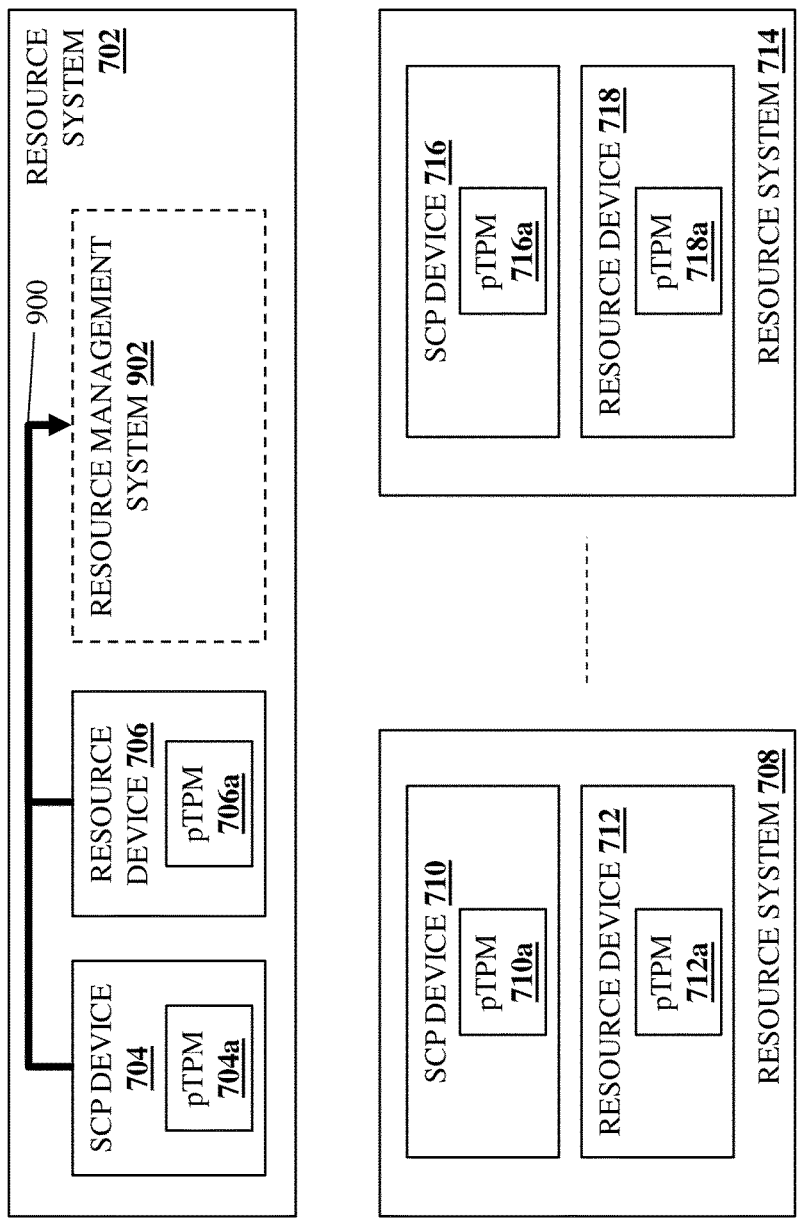
FIG. 9A is a schematic view illustrating an embodiment of the LCS provisioning subsystem of FIG. 7 operating during the method of FIG. 8.

The method 800 begins at block 802 where an SCP device provides a resource management system. With reference to FIG. 9A, in an embodiment of block 802, the SCP device 704 may perform resource management system provisioning operations 900 in order to provide a resource management system 900. For example, the resource management system 902 may be the resource management system 304 in the LCS provisioning subsystem 300 described above with reference to FIG. 3, and thus may include an SCPM subsystem. In the illustrated example, the SCP device 704 utilizes the resource device 706 to provide the resource management system 902, and one of skill in the art in possession of the present disclosure will appreciate how the resource device 706 may be utilized as illustrated in FIG. 9A to provide any of a variety of functionality for the resource management system 902 in addition to any functionality that may be provided by the SCP device 704. However, while illustrated as being provided by both the SCP device 704 and the resource device 706, one of skill in the art in possession of the present disclosure will appreciate how the resource management system 902 may be provided by only the SCP device 704 while remaining within the scope of the present disclosure as well.

Figure 9B:
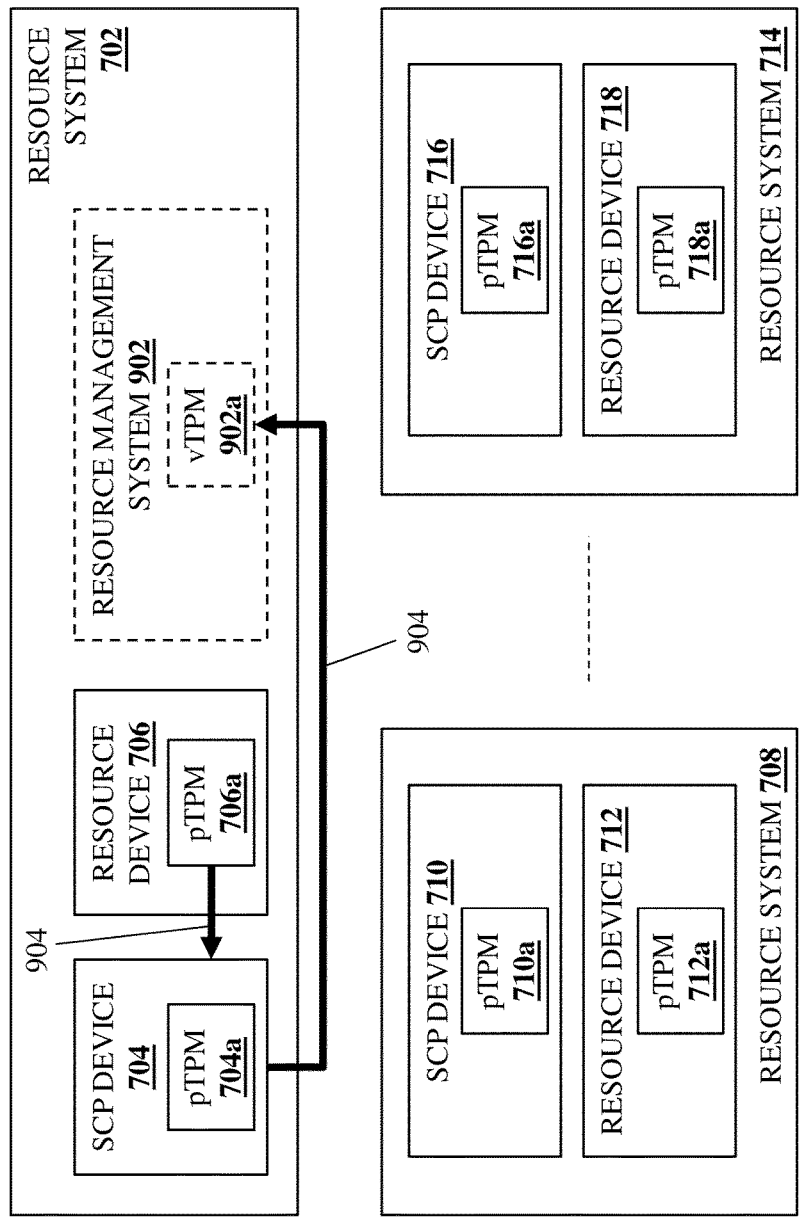
FIG. 9B is a schematic view illustrating an embodiment of the LCS provisioning subsystem of FIG. 7 operating during the method of FIG. 8.

With reference to FIG. 9B, the provisioning of the resource management system 900 at block 802 may include the SCP device 704 performing vTPM provisioning operations 904 that include providing a vTPM 902a for the resource management system 902 that one of skill in the art in possession of the present disclosure will appreciate may be provided by software (e.g., including a secure storage provided using an a ".nvram file" or other virtual machine data file that may be encrypted using virtual machine encryption) using any of a variety of vTPM provisioning techniques that would be apparent to one of skill in the art in possession of the present disclosure. As will be appreciated by one of skill in the art in possession of the present disclosure, the vTPMs described below differ from the pTPMs discussed herein in that they are adhoc-created, virtualized TPMs that are created using software and that operate to emulate a pTPM. As such, the vTPMs discussed herein are not expected to be present for the life of any corresponding hardware for which they are provided (i.e., the vTPM 902a is not expected to be present for the life of the hardware that provides the resource management system 902), and rather may only exist as long as the software entity for which they were created (e.g., the vTPM 902a will be present for the life of the resource management system 902).

For example, as illustrated in FIG. 9B, the vTPM provisioning operations 904 may include the SCP device 704 retrieving a pTPM endorsement key for the pTPM 706a in the resource device 706 and using it with a pTPM endorsement key for the pTPM 704a in the SCP device 704 to generate a combined pTPM endorsement key, and then using that combined pTPM endorsement key to generate a vTPM endorsement key for the vTPM 902a that is provided for the resource management system 902. In one specific example, the vTPM endorsement key for the vTPM 902a may be generated using a Key Derivation Function (KDF) that incorporates any corresponding lineage (e.g., with the pTPM 704a as a "grandparent" and the pTPM 706a as a "parent" in this specific example). As will be appreciated by one of skill in the art in possession of the present disclosure, such vTPM endorsement key operations generate a relatively "tightly-bound" vTPM endorsement key that only operates as long as none of the TPM entities in the lineage change.

In another specific example, the vTPM endorsement key for the vTPM 902a may be generated using a KDF that incorporates only the most recent lineage (e.g., with the pTPM 706a as a "parent" in this specific example). As will be appreciated by one of skill in the art in possession of the present disclosure, such vTPM endorsement key operations generate relatively more "modular" vTPM endorsement key that only binds that vTPM endorsement key to the parent used to generate it. In either situation, one of skill in the art in possession of the present disclosure will appreciate how the "parent" discussed above may sign a vTPM certificate associated with the vTPM endorsement key in order to "install" the vTPM 902a so that it may operate as described below. However, while a specific example of providing a resource management engine with a vTPM has been described, one of skill in the art in possession of the present disclosure will appreciate how the resource management system and its vTPM may be providing in a variety of manners that will fall within the scope of the present disclosure as well.

Figure 10:
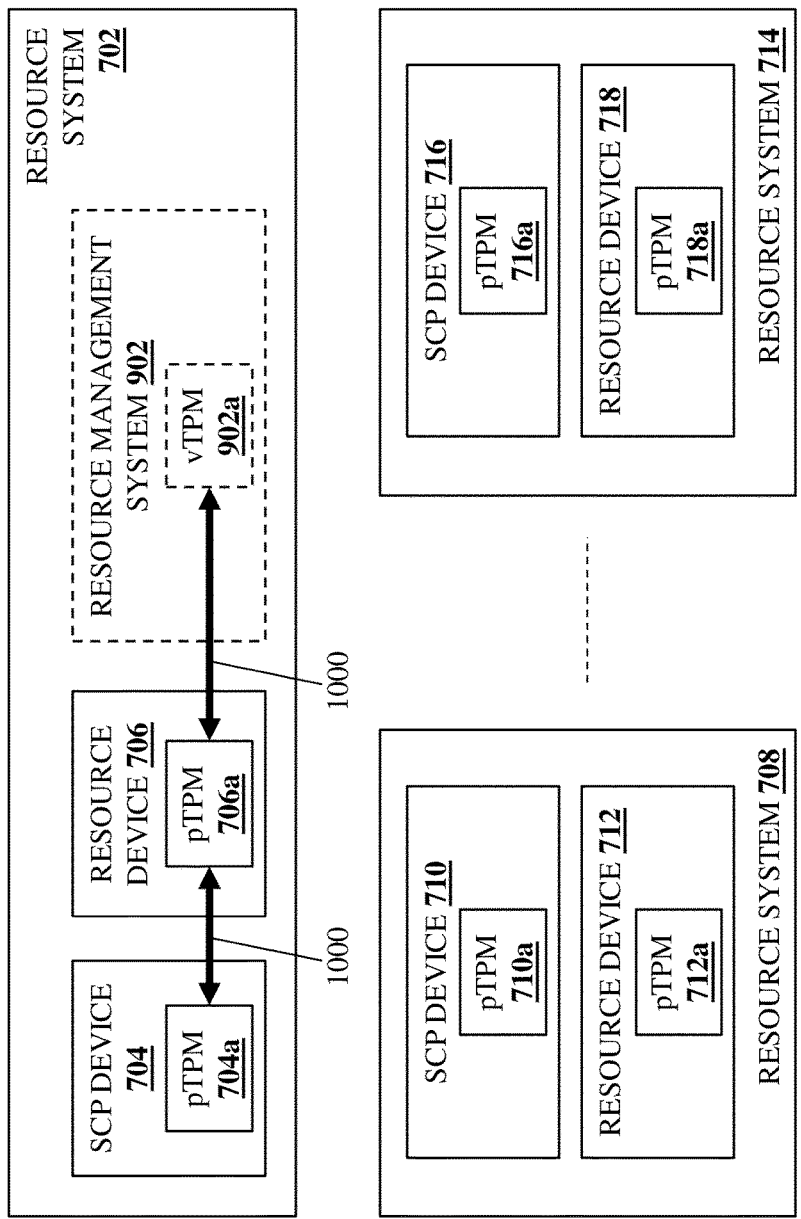
FIG. 10 is a schematic view illustrating an embodiment of the LCS provisioning subsystem of FIG. 7 operating during the method of FIG. 8.

The method 800 then proceeds to block 804 where the resource management system establishes a trust relationship with the SCP device. With reference to FIG. 10, in an embodiment of block 804, the resource management system 902, the SCP device 704, and the resource device 706 may perform trust relationship establishment operations 1000 that, in the illustrated embodiment, includes the SCP device 704 using its pTPM 704a and the resource device 706 using its pTPM 706a to establish an SCP device/resource device trust relationship (e.g., using a Transport Layer Security (TLS) protocol, a Security Protocol and Data Model (SPDM) protocol, and/or other trust-relationship-establishment TPM techniques that would be apparent to one of skill in the art in possession of the present disclosure), and the resource management system 902 using its vTPM 902a and the resource device 706 using its pTPM 706a to establish a resource management system/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers), and one of skill in the art in possession of the present disclosure will appreciate how establishment of the SCP device/resource device trust relationship and resource management system/resource device trust relationship operates to establish an SCP device/resource management system trust relationship between the SCP device 704 and the resource management system 902.

However, while a specific example of the establishment of a trust relationship between the resource management system 900 and the SCP device 704 has been described, one of skill in the art in possession of the present disclosure will appreciate how the SCP device/resource management system trust relationship may be established directly between the resource management system 900 and the SCP device 704 (e.g., when the SCP device 704 provides the resource management system 900 without the use of any resource devices), or via multiple resource devices similarly as described above for the resource device 706 (e.g., when the SCP device 704 provides the resource management system 900 using a plurality resource devices), while remaining within the scope of the present disclosure as well.

Figure 11:
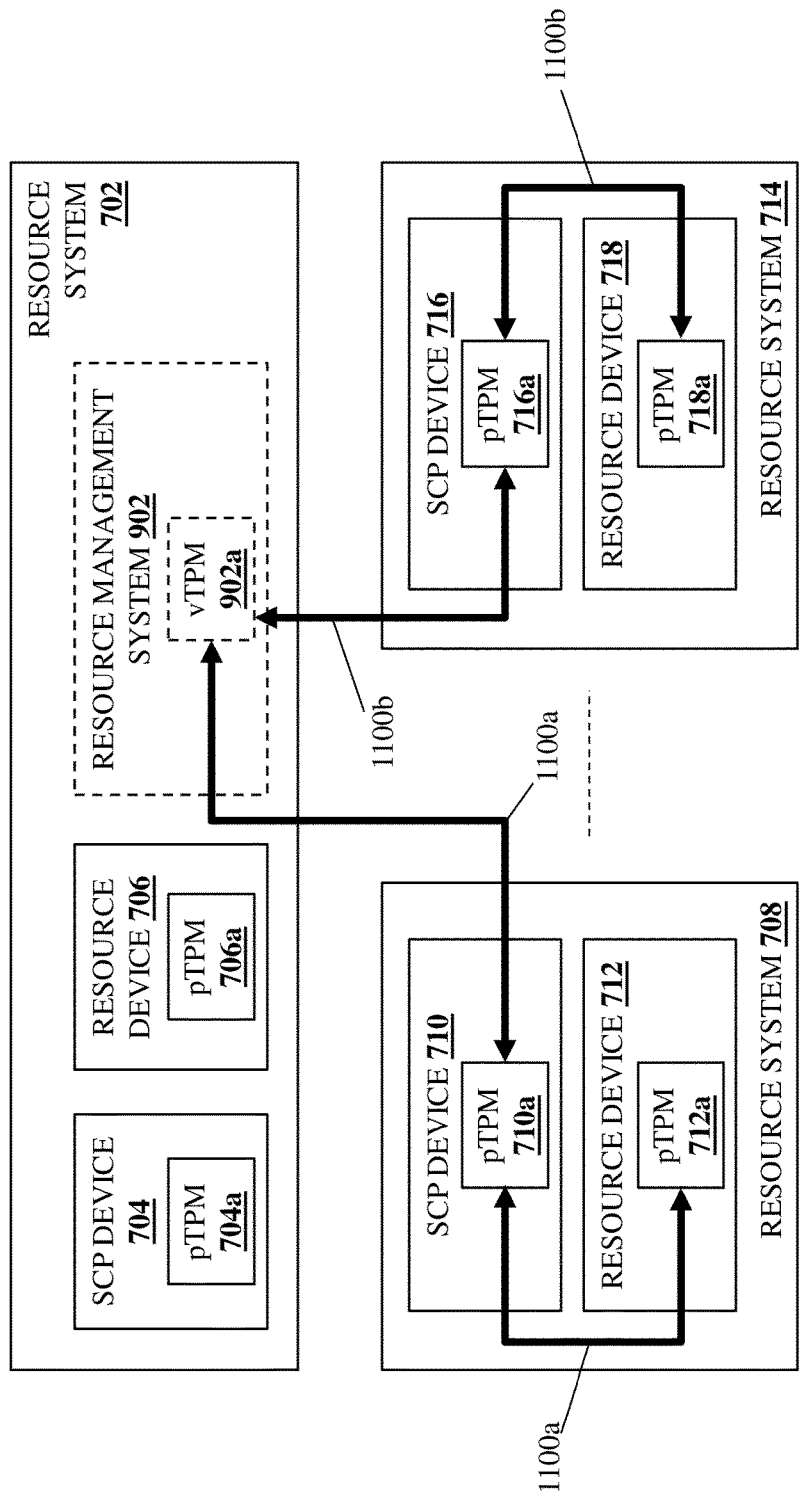
FIG. 11 is a schematic view illustrating an embodiment of the LCS provisioning subsystem of FIG. 7 operating during the method of FIG. 8.

The method 800 then proceeds to block 806 where the resource management system establishes a trust relationship with resource devices. With references to FIG. 11, in an embodiment of block 806, the resource management system 902, the SCP device 710, and the resource device 712 may perform trust relationship establishment operations 1100a that, in the illustrated embodiment, includes the resource management system 902 using its vTPM 902a and the SCP device 710 using its pTPM 710a to establish a resource management system/SCP device trust relationship (e.g., using a TLS protocol, an SPDM protocol, and/or other trust-relationship-establishment TPM techniques that would be apparent to one of skill in the art in possession of the present disclosure), and the SCP device 710 using its pTPM 710a and the resource device 712 using its pTPM 712a to establish an SCP device/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers), and one of skill in the art in possession of the present disclosure will appreciate how establishment of the resource management system/SCP device trust relationship and the SCP device/resource device trust relationship operates to establish a resource management system/resource device trust relationship between the resource management system 902 and the resource device 712.

Similarly, in an embodiment of block 806, the resource management system 902, the SCP device 716, and the resource device 718 may perform trust relationship establishment operations 1100b that, in the illustrated embodiment, includes the resource management system 902 using its vTPM 902a and the SCP device 716 using its pTPM 716a to establish a resource management system/SCP device trust relationship (e.g., using a TLS protocol, an SPDM protocol, and/or other trust-relationship-establishment TPM techniques that would be apparent to one of skill in the art in possession of the present disclosure), and the SCP device 716 using its pTPM 716a and the resource device 718 using its pTPM 718a to establish an SCP device/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers), and one of skill in the art in possession of the present disclosure will appreciate how establishment of the resource management system/SCP device trust relationship and the SCP device/resource device trust relationship operates to establish a resource management system/resource device trust relationship between the resource management system 902 and the resource device 718.

As such, one of skill in the art in possession of the present disclosure will appreciate how the resource management system 902 may establish respective resource management system/resource device trust relationships with each of the resource devices coupled to it, which as discussed above may include any number of resource devices in the resource system 708, other resource systems, and up to the resource system 714. Furthermore, while a specific example of the establishment of a trust relationship between the resource management system 900 and each resource device via a respective SCP device has been described, one of skill in the art in possession of the present disclosure will appreciate how the resource management system/resource device trust relationships may be established directly between the resource management system 900 and those resource devices (e.g., when the resource management system 902 is coupled to those resource device(s) directly in the resource system 702) while remaining within the scope of the present disclosure as well.

Figure 12A:
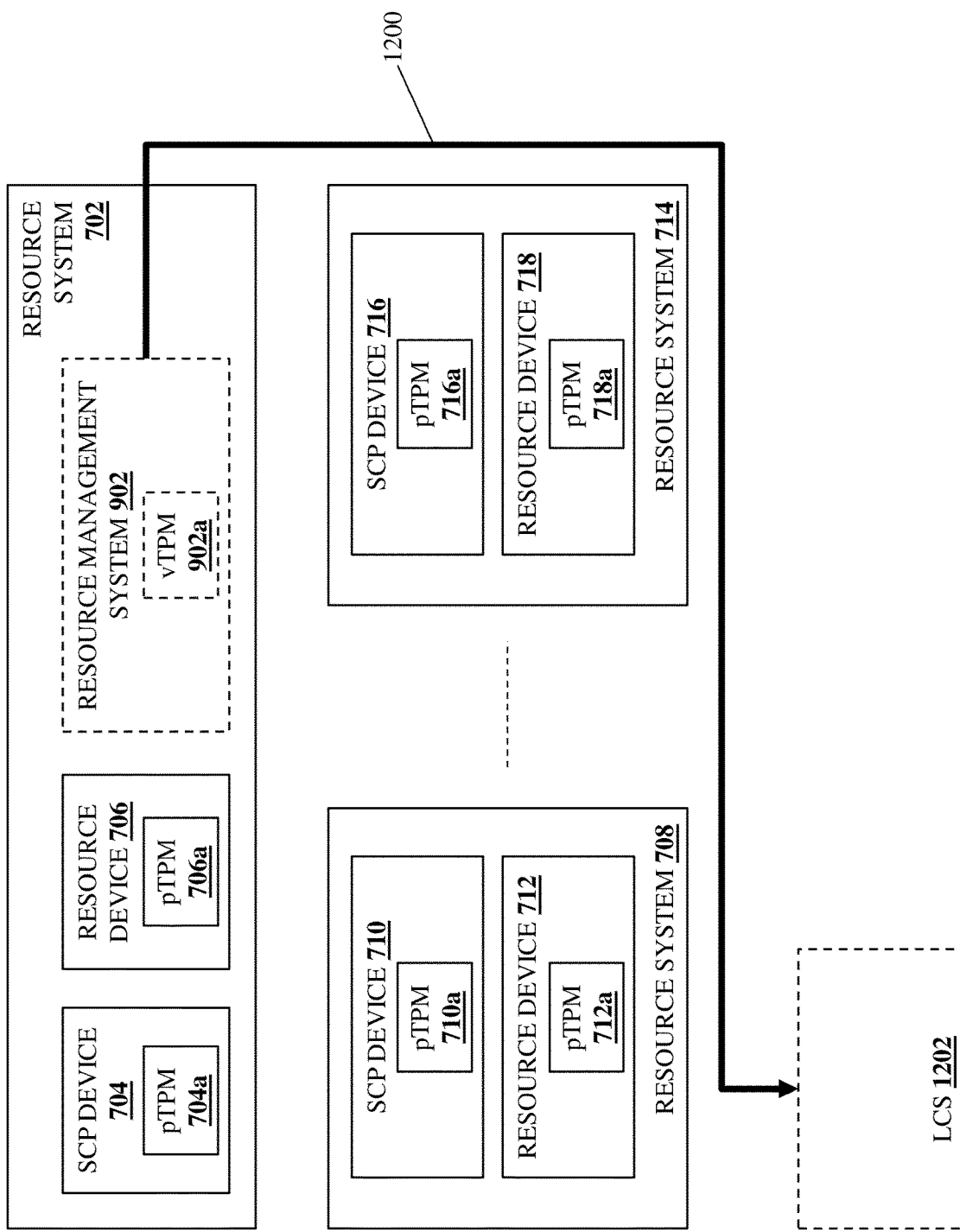
FIG. 12A is a schematic view illustrating an embodiment of the LCS provisioning subsystem of FIG. 7 operating during the method of FIG. 8.

The method 800 then proceeds to block 808 where the resource management system provides an LCS with a subset of the resource devices. With reference to FIG. 12A, in an embodiment of block 808, the resource management system 902 may perform LCS provisioning operations 1200 that operate to provide an LCS 1202. As will be appreciated by one of skill in the art in possession of the present disclosure, the LCS provisioning operations 1200 may include a microvisor provided by the resource management system 902 (or any of a variety of other secondary runtime entities provided by the resource management system 902) providing the LCS 1202. In the specific examples provided below, the LCS 1202 is illustrated and described as being provided using the resource devices 712 and 718, but one of skill in the art in possession of the present disclosure will appreciate how the LCS 1202 may be provided using any subset of the resource devices available to the resource management system 902 similarly as described above.

Figure 12B:
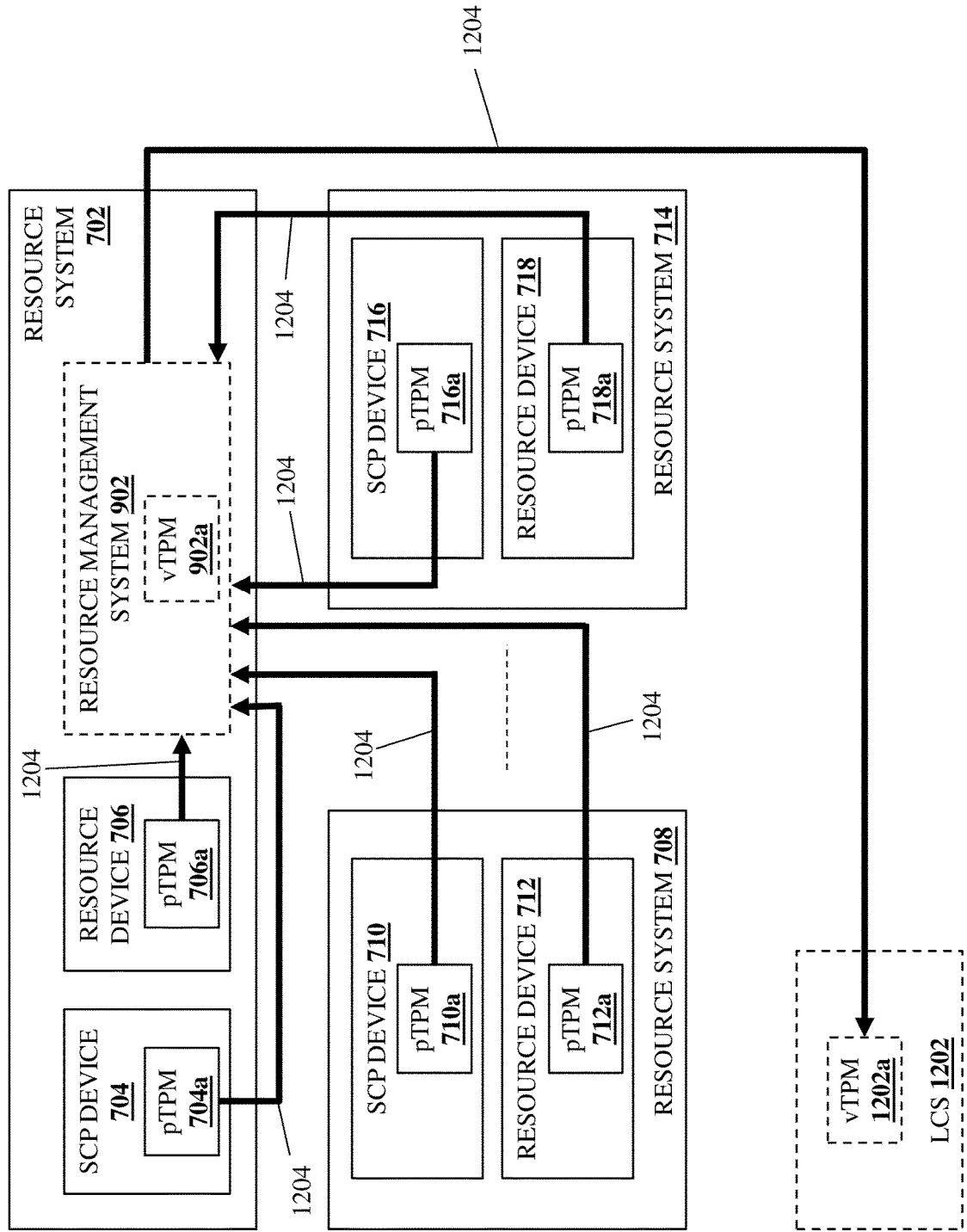
FIG. 12B is a schematic view illustrating an embodiment of the LCS provisioning subsystem of FIG. 7 operating during the method of FIG. 8.

With reference to FIG. 12B, in an embodiment of block 808, the resource management system 902 may perform vTPM provisioning operations 1204 that include providing a vTPM 1202a for the LCS 1202. In an embodiment, the vTPM 1202a described below may be similar to the vTPMs discussed above and may be provided using any of a variety of vTPM provisioning techniques that would be apparent to one of skill in the art in possession of the present disclosure.

For example, as illustrated in FIG. 12B, the vTPM provisioning operations 1204 may include the resource management system 902 retrieving a pTPM endorsement key for the pTPM 704a in the SCP device 704, a pTPM endorsement key for the pTPM 706a in the resource device 706, a pTPM endorsement key for the pTPM 710a in the SCP device 710 and a pTPM endorsement key for the pTPM 712a in the resource device 712, and up to a pTPM endorsement key for the pTPM 716a in the SCP device 716 and a pTPM endorsement key for the pTPM 718a in the resource device 718, using them to generate a combined pTPM endorsement key, and then using that combined pTPM endorsement key to generate a vTPM endorsement key (e.g., a combination of a key and certificate that verifies that key) for the vTPM 1202a that is provided for the LCS 1202 and that may be used as a "trust anchor" for the identity of the LCS 1202. Furthermore, one of skill in the art in possession of the present disclosure will appreciate how the vTPM 1202a may also include Platform Configuration Registers (PCRs) that may be used to verify integrity of a state of the LCS 1202, as well as any other vTPM components known in the art.

Figure 13A:
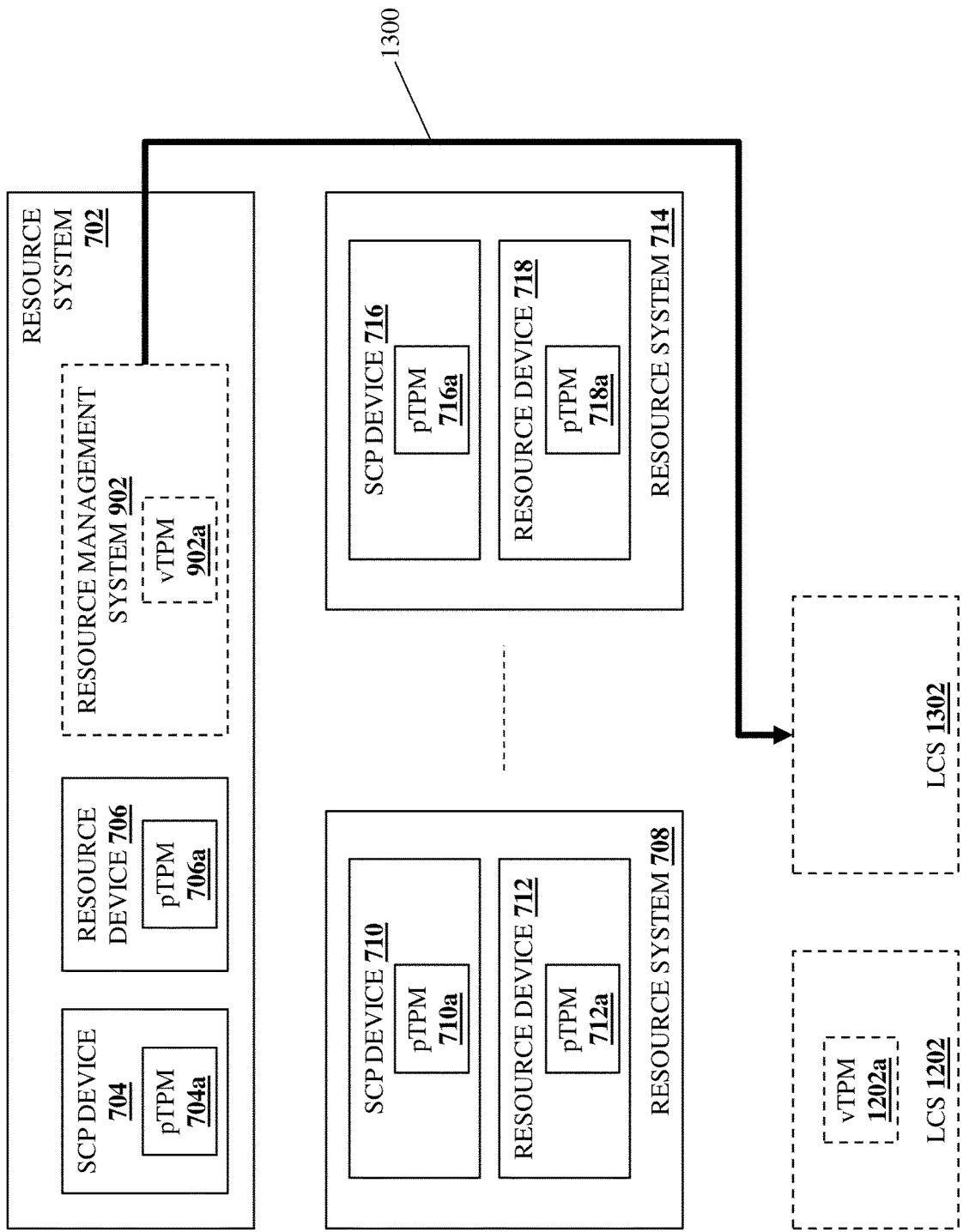
FIG. 13A is a schematic view illustrating an embodiment of the LCS provisioning subsystem of FIG. 7 operating during the method of FIG. 8.

With reference to FIG. 13A, in an embodiment of block 808, the resource management system 902 may perform LCS provisioning operations 1300 that operate to provide an LCS 1302. As will be appreciated by one of skill in the art in possession of the present disclosure, the LCS provisioning operations 1300 may include a microvisor provided by the resource management system 902 (or any of a variety of other secondary runtime entities provided by the resource management system 902) providing the LCS 1302. In the specific examples provided below, the LCS 1302 is illustrated and described as being provided using the resource device 712 and one or more other resource devices including in resource systems that are not visible in FIG. 13, but one of skill in the art in possession of the present disclosure will appreciate how the LCS 1302 may be provided using any subset of the resource devices available to the resource management system 902 similarly as described above.

Figure 13B:
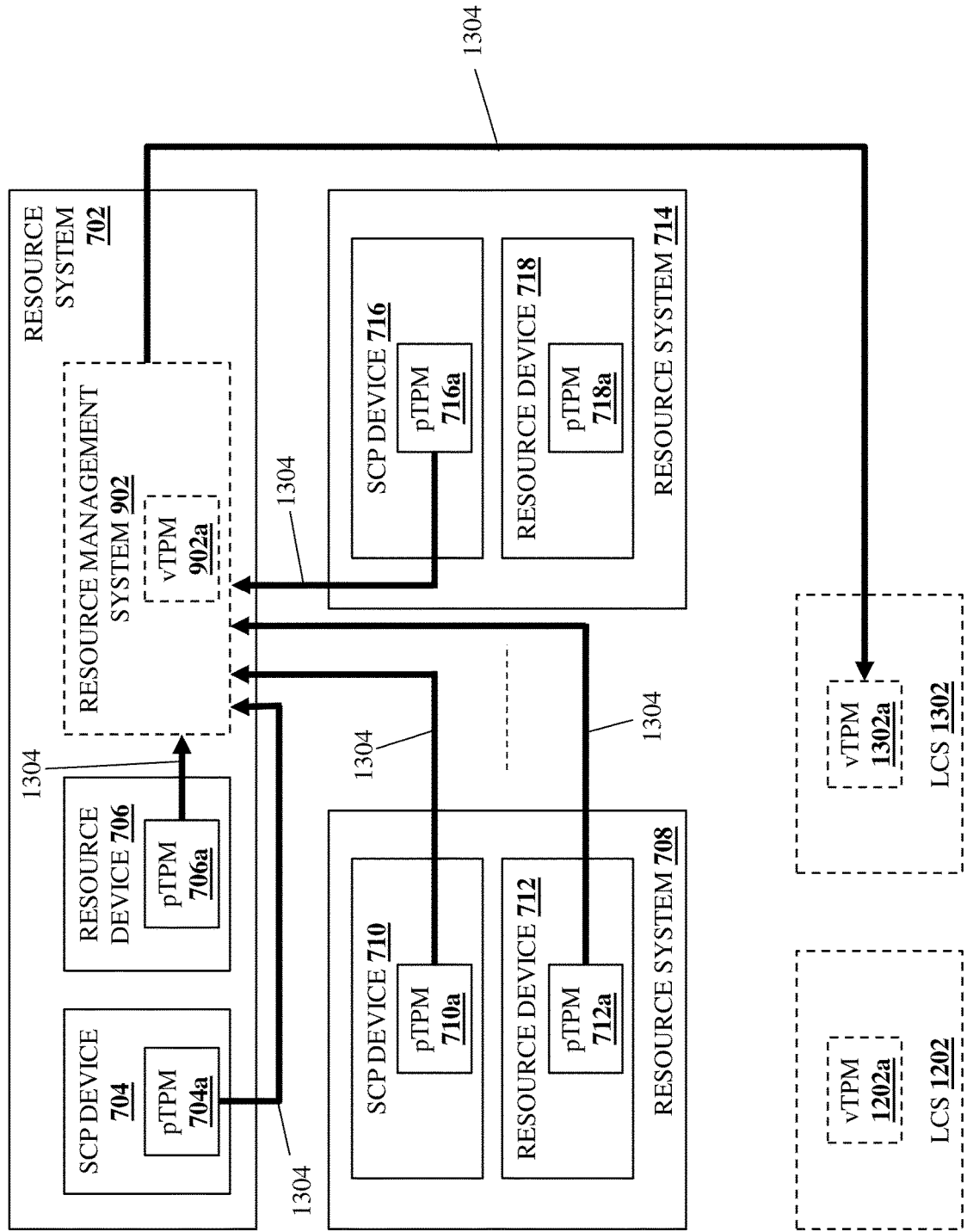
FIG. 13B is a schematic view illustrating an embodiment of the LCS provisioning subsystem of FIG. 7 operating during the method of FIG. 8.

With reference to FIG. 13B, in an embodiment of block 808, the resource management system 902 may perform vTPM provisioning operations 1304 that include providing a vTPM 1302a for the LCS 1302. In an embodiment, the vTPM 1302a described below may be similar to the vTPMs discussed above and may be provided by software using any of a variety of vTPM provisioning techniques that would be apparent to one of skill in the art in possession of the present disclosure.

For example, as illustrated in FIG. 13B, the vTPM provisioning operations 1304 may include the resource management system 902 retrieving a pTPM endorsement key for the pTPM 704a in the SCP device 704, a pTPM endorsement key for the pTPM 706a in the resource device 706, a pTPM endorsement key for the pTPM 710a in the SCP device 710 and a pTPM endorsement key for the pTPM 712a in the resource device 712, as well as a pTPM endorsement key for a pTPM in any other SCP device and a pTPM endorsement key for a pTPM in any other resource device used to provide the LCS 1302, using them to generate a combined pTPM endorsement key, and then using that combined pTPM endorsement key to generate a vTPM endorsement key (e.g., a combination of a key and certificate that verifies that key) for the vTPM 1302a that is provided for the LCS 1302 and that may be used as a "trust anchor" for the identity of the LCS 1302. Furthermore, one of skill in the art in possession of the present disclosure will appreciate how the vTPM 1302a may also include Platform Configuration Registers (PCRs) that may be used to verify integrity of a state of the LCS 1302, as well as any other vTPM components known in the art.

Figure 14A:
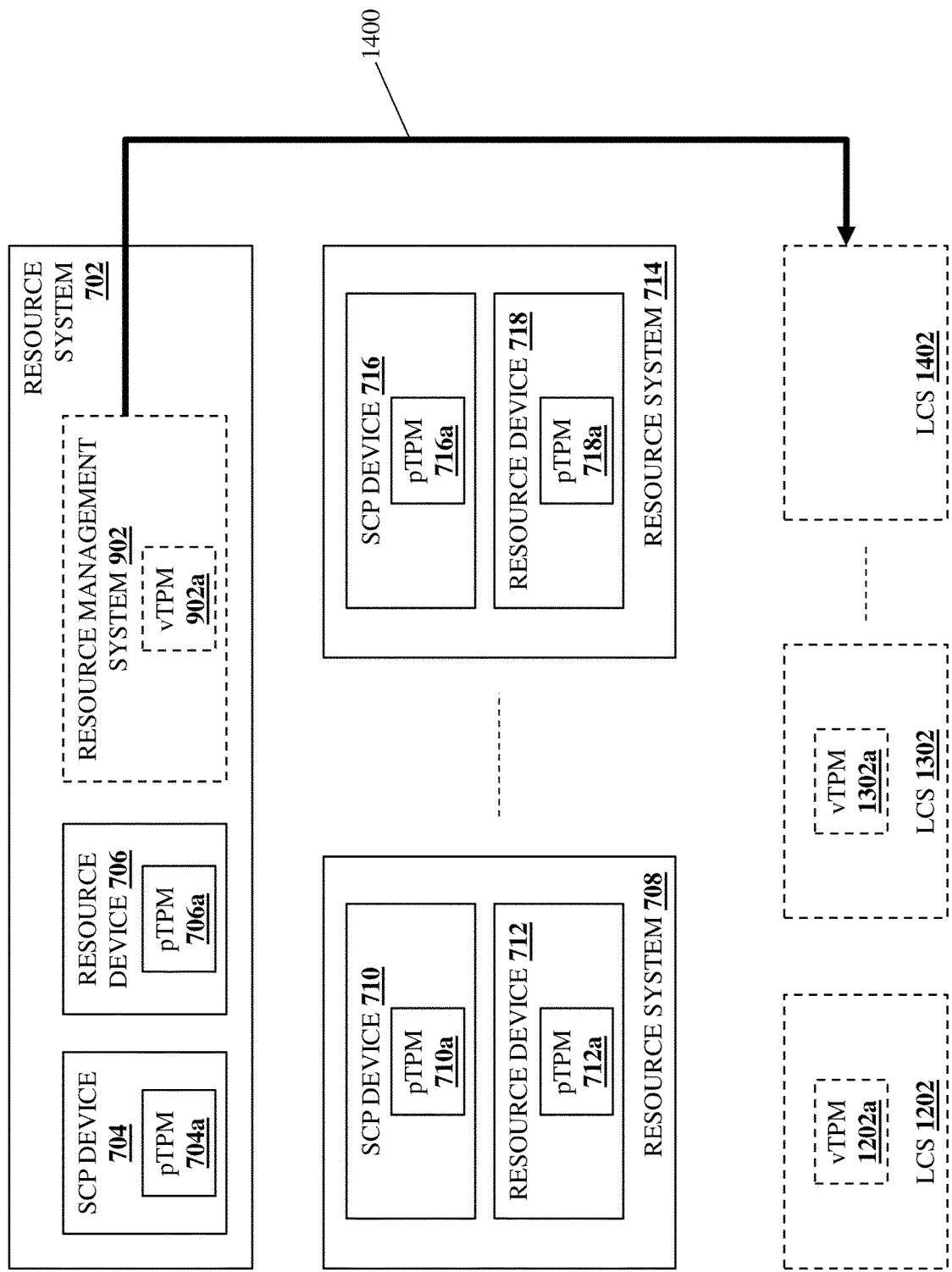
FIG. 14A is a schematic view illustrating an embodiment of the LCS provisioning subsystem of FIG. 7 operating during the method of FIG. 8.

With reference to FIG. 14A, in an embodiment of block 808, the resource management system 902 may perform LCS provisioning operations 1400 that operate to provide an LCS 1402. As will be appreciated by one of skill in the art in possession of the present disclosure, the LCS provisioning operations 1400 may include a microvisor provided by the resource management system 902 (or any of a variety of other secondary runtime entities provided by the resource management system 902) providing the LCS 1402. In the specific examples provided below, the LCS 1402 is illustrated and described as being provided using the resource devices 712 and one or more other resource devices including in resource systems that are not visible in FIG. 14, but one of skill in the art in possession of the present disclosure will appreciate how the LCS 1402 may be provided using any resource devices available to the resource management system 902 similarly as described above.

Figure 14B:
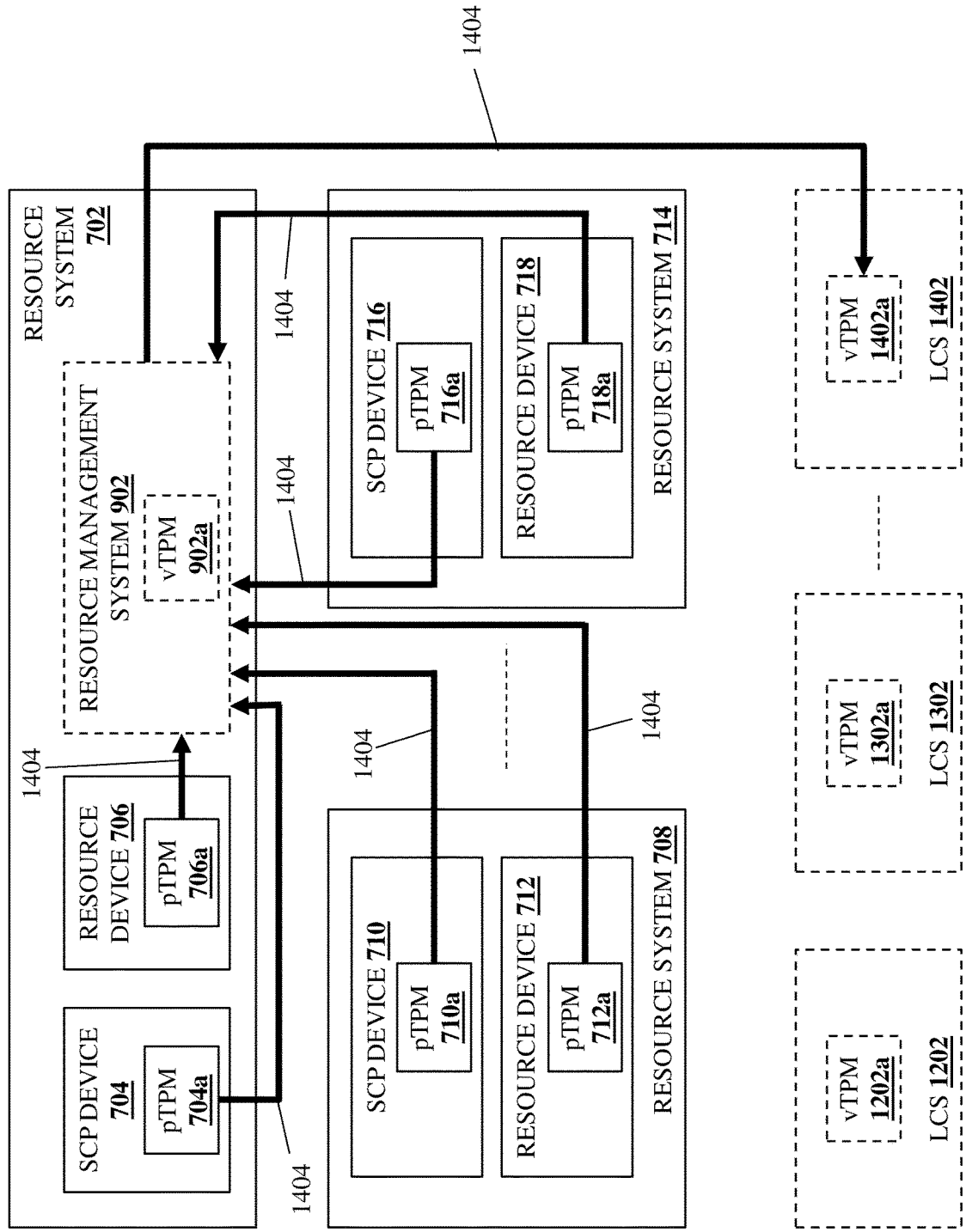
FIG. 14B is a schematic view illustrating an embodiment of the LCS provisioning subsystem of FIG. 7 operating during the method of FIG. 8.

With reference to FIG. 14B, in an embodiment of block 808, the resource management system 902 may perform vTPM provisioning operations 1404 that include providing a vTPM 1402a for the LCS 1402. In an embodiment, the vTPM 1402a described below may be similar to the vTPMs discussed above and may be provided using any of a variety of vTPM provisioning techniques that would be apparent to one of skill in the art in possession of the present disclosure.

For example, as illustrated in FIG. 14B, the vTPM provisioning operations 1404 may include the resource management system 902 retrieving a pTPM endorsement key for the pTPM 704a in the SCP device 704, a pTPM endorsement key for the pTPM 706a in the resource device 706, a pTPM endorsement key for the pTPM 710a in the SCP device 710 and a pTPM endorsement key for the pTPM 712a in the resource device 712, as well as a pTPM endorsement key for a pTPM in any other SCP device and a pTPM endorsement key for a pTPM in any other resource device used to provide the LCS 1302, using them to generate a combined pTPM endorsement key, and then using that combined pTPM endorsement key to generate a vTPM endorsement key (e.g., a combination of a key and certificate that verifies that key) for the vTPM 1402a that is provided for the LCS 1402 and that may be used as a "trust anchor" for the identity of the LCS 1402. Furthermore, one of skill in the art in possession of the present disclosure will appreciate how the vTPM 1402a may also include Platform Configuration Registers (PCRs) that may be used to verify integrity of a state of the LCS 1402, as well as any other vTPM components known in the art.

As such, a plurality of LCSs 1202, 1302, and up to 1402 may be provided at block 808 using any subsets of resource devices available to the resource management system 902 similarly as described above. Furthermore, while specific examples of providing the LCSs 1202, 1302, and up to 1402 with respective vTPMs 1202a, 1302a, and up to 1402a has been described, one of skill in the art in possession of the present disclosure will appreciate how LCSs may be provided with vTPMs in a variety of manners that will fall within the scope of the present disclosure as well.

Figure 15:
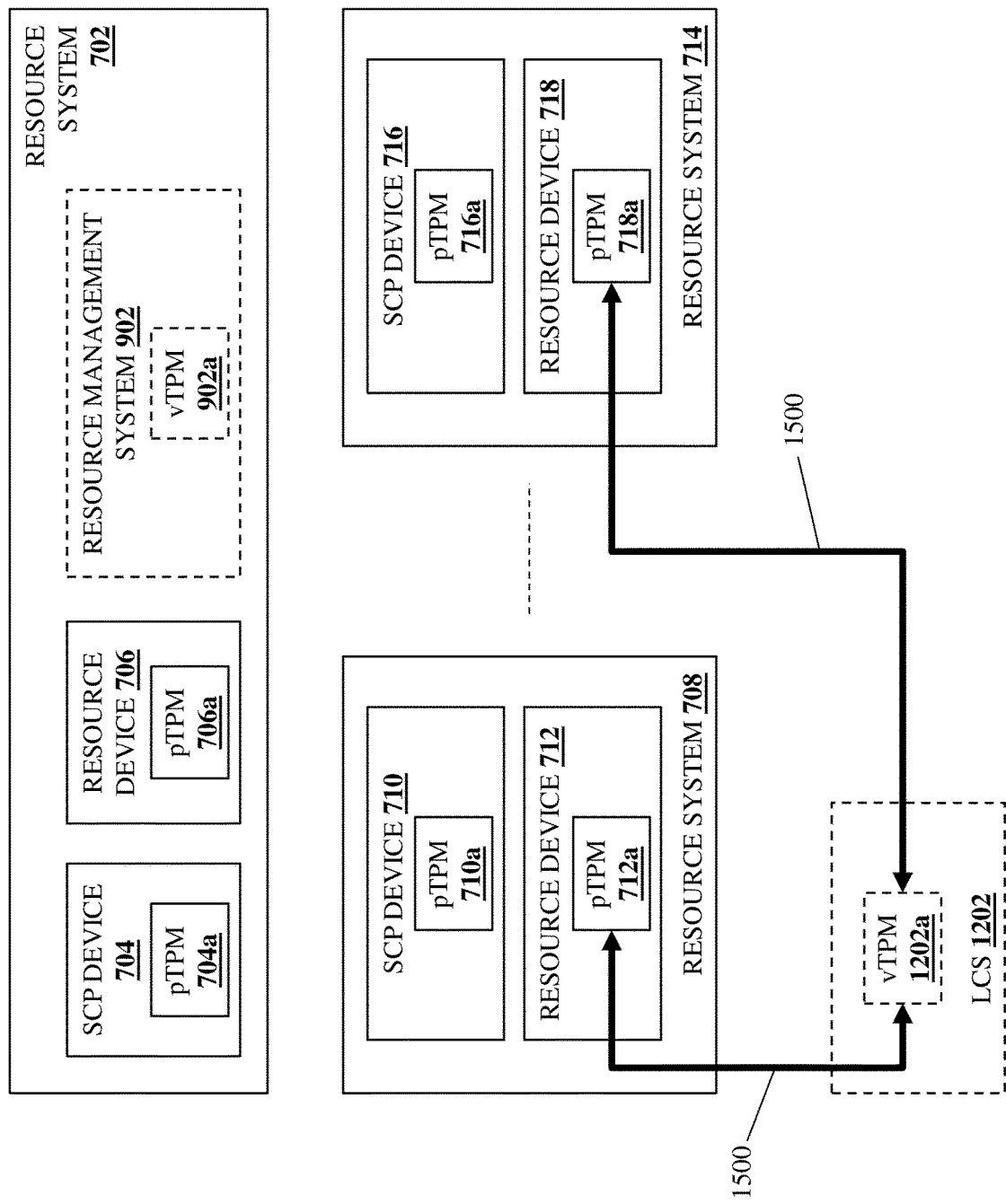
FIG. 15 is a schematic view illustrating an embodiment of the LCS provisioning subsystem of FIG. 7 operating during the method of FIG. 8.

The method 800 then proceeds to block 810 where the LCS establishes a trust relationship with the subset of resource devices that are being used to provide the LCS. With references to FIG. 15, in an embodiment of block 810, the LCS 1202 (e.g., the microvisor or other secondary runtime entity discussed above that provides the LCS 1202), the resource device 712, and the resource device 718 may perform trust relationship establishment operations 1500 that, in the illustrated embodiment, includes the LCS 1202 using its vTPM 1202a and the resource device 712 using its pTPM 712a to establish an LCS/resource device trust relationship (e.g., using a TLS protocol, an SPDM protocol, and/or other trust-relationship-establishment TPM techniques that would be apparent to one of skill in the art in possession of the present disclosure), and the LCS 1202 using its vTPM 1202a and the resource device 718 using its pTPM 718a to establish an LCS/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers).

As will be appreciated by one of skill in the art in possession of the present disclosure, the establishment of the SCP device/resource management system trust relationship between the SCP device 704 and the resource management system 902, the establishment of the resource management system/resource device trust relationships between the resource management system 902 and each of the resource devices 712 and 718, and the establishment of the LCS/resource device trust relationship between the LCS 1202 and each of the resource devices 712 and 718 operates to provide a TPM hierarchy that establishes a "chain of trust" that ensures trusted operation of the LCS 1202.

Figure 16:
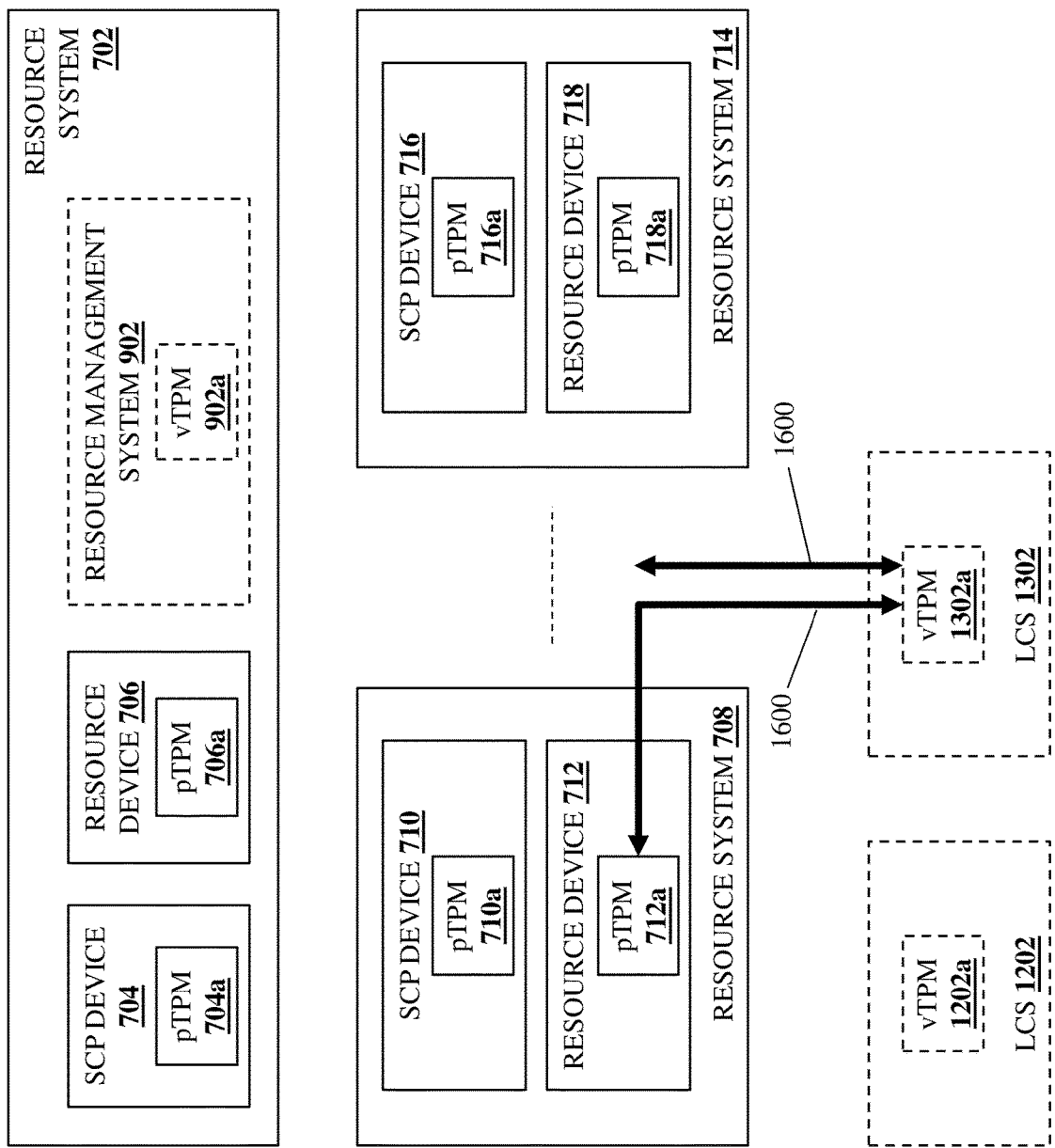
FIG. 16 is a schematic view illustrating an embodiment of the LCS provisioning subsystem of FIG. 7 operating during the method of FIG. 8.

Similarly, with references to FIG. 16, in an embodiment of block 810, the LCS 1302 (e.g., the microvisor or other secondary runtime entity discussed above that provides the LCS 1302), the resource device 712, and any other resource device(s) used to provide the LCS 1302 may perform trust relationship establishment operations 1600 that, in the illustrated embodiment, includes the LCS 1302 using its vTPM 1302a and the resource device 712 using its pTPM 712a to establish an LCS/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers), and the LCS 1302 using its vTPM 1302a and any other resource device that provides the LCS 1302 using its pTPM to establish an LCS/resource device trust relationship (e.g., using a TLS protocol, an SPDM protocol, and/or other trust-relationship-establishment TPM techniques that would be apparent to one of skill in the art in possession of the present disclosure).

As will be appreciated by one of skill in the art in possession of the present disclosure, the establishment of the SCP device/resource management system trust relationship between the SCP device 704 and the resource management system 902, the establishment of the resource management system/resource device trust relationships between the resource management system 902 and each of the resource device 712 and any other resource device used to provide the LCS 1302, and the establishment of the LCS/resource device trust relationship between the LCS 1302 and each of the resource device 712 and any other resource device used to provide the LCS 1302 operates to provide a TPM hierarchy that establishes a "chain of trust" that ensures trusted operation of the LCS 1302.

Figure 17:
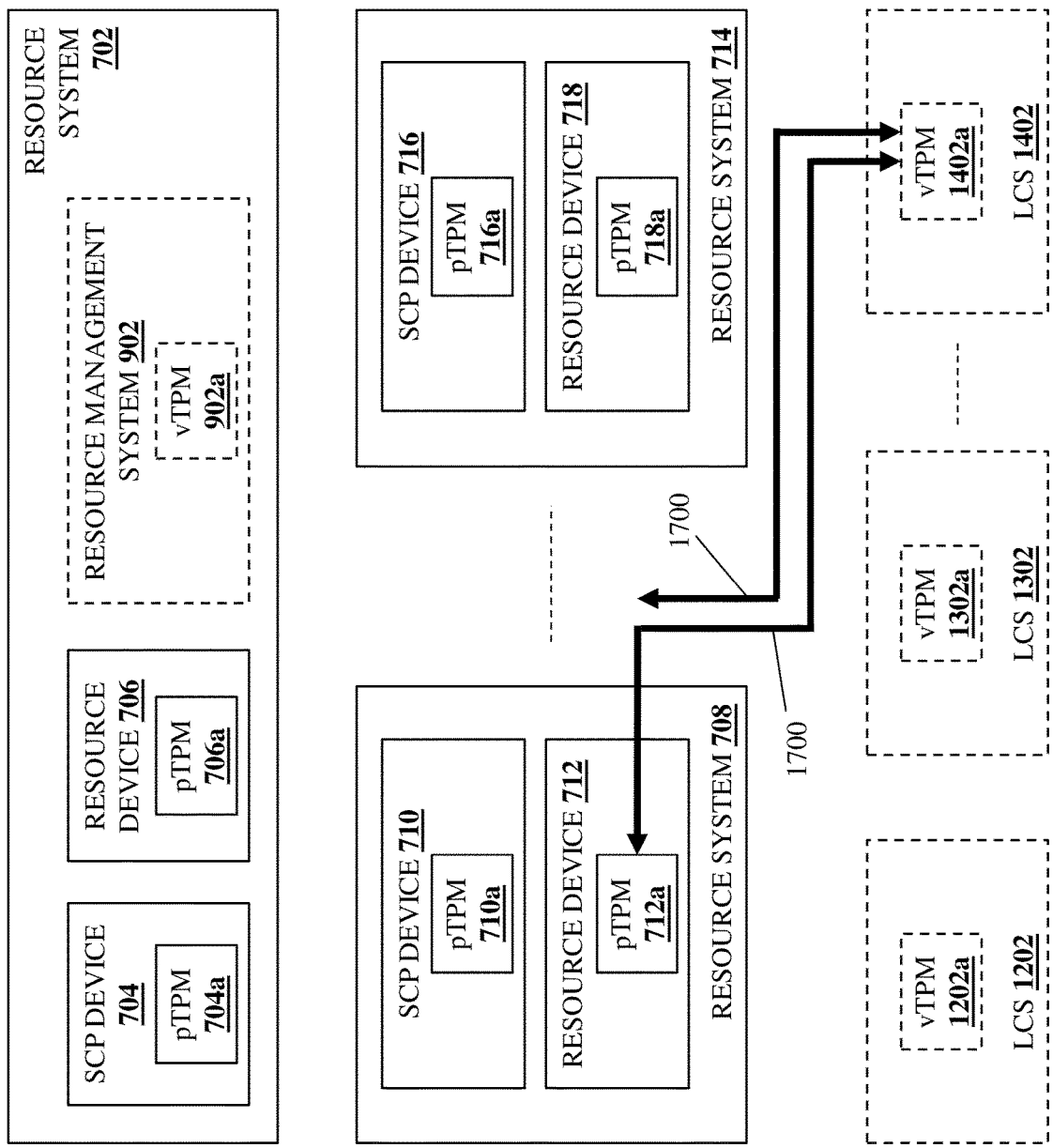
FIG. 17 is a schematic view illustrating an embodiment of the LCS provisioning subsystem of FIG. 7 operating during the method of FIG. 8.

Similarly, with references to FIG. 17, in an embodiment of block 810, the LCS 1402 (e.g., the microvisor or other secondary runtime entity discussed above that provides the LCS 1402), the resource device 712, and any other resource device(s) used to provide the LCS 1402 may perform trust relationship establishment operations 1700 that, in the illustrated embodiment, includes the LCS 1402 using its vTPM 1402a and the resource device 712 using its pTPM 712a to establish an LCS/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers), and the LCS 1402 using its vTPM 1402a and any other resource device that provides the LCS 1402 using its pTPM to establish an LCS/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers).

As will be appreciated by one of skill in the art in possession of the present disclosure, the establishment of the SCP device/resource management system trust relationship between the SCP device 704 and the resource management system 902, the establishment of the resource management system/resource device trust relationships between the resource management system 902 and each of the resource device 712 and any other resource device used to provide the LCS 1402, and the establishment of the LCS/resource device trust relationship between the LCS 1402 and each of the resource device 712 and any other resource device used to provide the LCS 1402 operates to provide a TPM hierarchy that establishes a "chain of trust" that ensures trusted operation of the LCS 1402.

Figure 18:
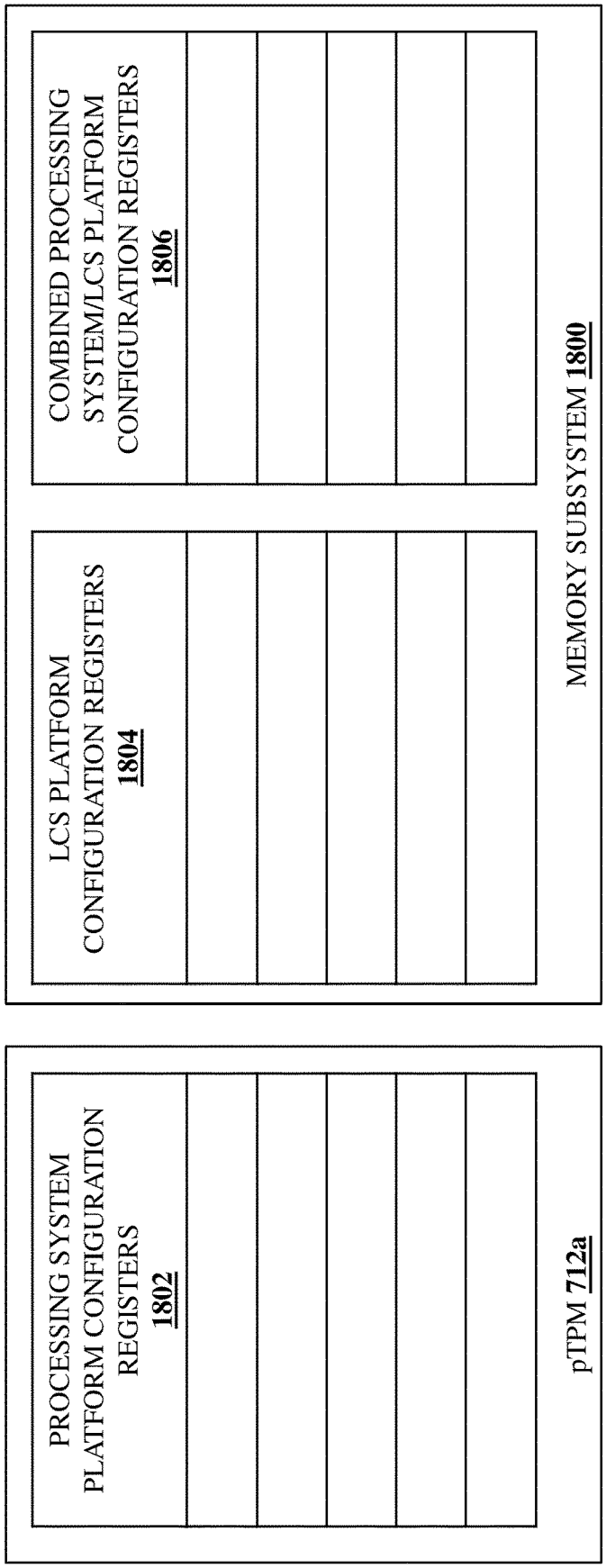
FIG. 18 is a schematic view illustrating an embodiment of a pTPM in the LCS provisioning subsystem of FIG. 7 during the method of FIG. 8.

In an embodiment, the resource device 712 that provides each of the LCSs 1202, 1302, and 1402 in the specific example provided above may be provided by a processing system (e.g., a "host" processing system like the CPUs 602a-606a in the BMSs 602-606, respectively, described below with reference to FIG. 6). With reference to FIG. 18, an embodiment of the pTPM 712a included in (or provided for) the processing system resource device 712 in such a situation is illustrated, along with a memory subsystem 1800 that one of skill in the art in possession of the present disclosure will appreciate may be secured by the pTPM 712a. In the illustrated embodiment, the pTPM 712a includes processing system Platform Configuration Registers (PCRs) 1802, and one of skill in the art in possession of the present disclosure will appreciate how the processing system PRCs 1802 may be provided in a memory location of the pTPM 712a, and may be used to store different processing system states of the processing system resource device 712 in order to allow those processing system states to have their integrity verified.

As such, one of skill in the art in possession of the present disclosure will appreciate how the processing system PRCs 1802 may identify a history of software that has run on the processing system resource device 712 since the initialization of the processing system resource device 712 using hashing operations to "extend" values stored in the processing system PRCs 1802 each time a new piece of software is run. To provide a specific example, the processing system PCRs 1802 may be "zeroed out" during a boot or other initialization of the resource system 708, then may be updated one or more times with corresponding values via the hashing operations described above as a Basic Input/Output System (BIOS) is provided by the processing system resource device 712, as a microvisor is provided by the processing system resource device 712, and as any other software is executed by that processing system, allowing the integrity of the states of the processing system provided by the execution of that software to be verified.

In the illustrated embodiment, the memory subsystem 1800 also includes LCS PCRs 1804, and one of skill in the art in possession of the present disclosure will appreciate how the resource management system 902 may provide one of the LCR PRCs 1804 for each of the vTPMs 1202a, 1302a, and 1402a in the LCSs 1202, 1302, and 1402, respectively. Similarly as discussed above, the LCS PRCs 1804 may be used to store different LCS states of its LCS in order to allow those LCS states to have their integrity verified. As such, the LCR PRCs 1804 may store a history of software that has run on its LCS since the initialization of that LCS using hashing operations to "extend" values stored in the LCS PCRs 1804 each time a new piece of software is run. To provide a specific example, the LCS PCRs 1804 may be "zeroed out" during a boot or other initialization of the LCS 1202, then may be updated one or more times with corresponding values via the hashing operations described above as different software is executed using the LCS 1202, allowing the integrity of the states of the LCS provided by the execution of that software to be verified.

In the illustrated embodiment, the memory subsystem 1800 also includes combined processing system/LCS PCRs 1806, and one of skill in the art in possession of the present disclosure will appreciate how the resource management system 902 may provide one of the combined processing system/LCS PCRs 1806 for each of the vTPMs 1202a, 1302a, and 1402a in the LCSs 1202, 1302, and 1402, respectively. Similarly as discussed above, the combined processing system/LCS PCRs 1806 may be used to store combined processing system/LCS states of each LCS provided by the processing system resource device 712 in order to allow those processing system/LCS states to have their integrity verified. As such, the combined processing system/LCS PCRs 1806 may store a history of software that has run on the processing system resource device 712 and its LCS since the initialization of the processing system resource device 712 using hashing operations to "extend" values stored in the combined processing system/LCS PCRs 1806 each time a new piece of software is run. To provide a specific example, the combined processing system/LCS PCRs 1806 may be "zeroed out" during a boot or other initialization of the resource system 708, then may be updated one or more times with corresponding values via the hashing operations described above as a different software is executed using resource device 712 and the LCS 1202 (e.g., when the microvisor described above launches an LCS and/or that LCS executes software), allowing the integrity of the states of the processing system resource device 712a and LCS provided by the execution of that software to be verified.

The method 800 then proceeds to decision block 812 where the method 800 proceeds depending on whether the LCS is subsequently provided with a different subset of resource devices. As discussed above, any of the LCSs 1202, 1302, or 1402 may be provided with different resource devices throughout its lifetime. As such, using the example of the initial provisioning of the LCS 1202 with the resource devices 712 and 718 at block 808, the method 800 may proceed depending on whether the LCS 1202 is provided with different resource devices following block 808 (e.g., either or both of the resource devices 712 and 718 becomes unavailable, either or both of the resource devices 712 and 718 is replaced with another resource device, one or more resource devices are used to provide the LCS 1202 in addition to the resource devices 712 and 718, etc.) If, at decision block 806, the LCS is being provided with the same subset of resource devices as at block 808, the method 800 returns to decision block 812. As such, the method 800 may loop such that the LCSs 1202, 1302, and 1402 continue to be provided by the resource devices utilized at block 808 until they either complete their workloads or are provided with a different subset of resource devices.

If, at decision block 806, the LCS is being provided with the different subset of resource devices as at block 808, the method 800 proceeds to block 814 where the LCS establishes a trust relationship with the new subset of resource devices that are being used to provide the LCS. Using the example of the initial provisioning of the LCS 1202 with the resource devices 712 and 718 at block 808, in an embodiment of block 814 and in response to the LCS 1202 being provided with different resource devices following block 808 (e.g., either or both of the resource devices 712 and 718 becomes unavailable, either or both of the resource devices 712 and 718 is replaced with another resource device, one or more resource devices are used to provide the LCS 1202 in addition to the resource devices 712 and 718, etc.), the LCS 1202 may perform trust relationship establishment operations similar to the trust relationship establishment operations 1500 discussed above that includes the LCS 1202 using its vTPM 1202a and any "new" resource device using its pTPM to establish an LCS/resource device trust relationship (e.g., using a mutual TLS protocol, a bi-directional SPDM protocol, and/or any other trust-relationship-establishment TPM techniques that one of skill in the art in possession of the present disclosure would recognize enables entities to establish authenticity of their peers).

As will be appreciated by one of skill in the art in possession of the present disclosure, the previous establishment (e.g., prior to block 814) of the SCP device/resource management system trust relationship between the SCP device 704 and the resource management system 902, the previous establishment (e.g., prior to block 814) of the resource management system/resource device trust relationships between the resource management system 902 and any of the resource devices 712 and 718 that will continue to be used to provide the LCS 1202 (e.g., subsequent to block 814), the previous establishment (e.g., prior to block 814) of the LCS/resource device trust relationship between the LCS 1202 and any of the resource devices 712 and 718 that will continue to be used to provide the LCS 1202 (e.g., subsequent to block 814), along with the current establishment (e.g., at block 814) of the LCS/resource device trust relationship between the LCS 1202 and any of the "new" resource devices that will subsequently be used to provide the LCS 1202, operates to dynamically update a TPM hierarchy that maintains the "chain of trust" established at block 810 that ensures trusted operation of the LCS 1202.

Furthermore, while only the LCS 1202 is described as being provided by a different subset of resource devices at decision block 812 and establishing trust relationships with those resource devices at block 814, one of skill in the art in possession of the present disclosure will appreciate how the LCS 1302 and 1402 (as well as any other LCSs) may operate in a similar manner while remaining within the scope of the present disclosure. The method 800 returns to decision block 812. As such, the method 800 may loop such that, as the resource devices used to provide any LCS change, that LCS will establish corresponding trust relationships with those resource devices to update its TPM hierarchy and maintain the "chain of trust" discussed above that ensures trusted operation of that LCS.

Thus, systems and methods have been described that provide a resource management system with a vTPM that allows it to establish trust relationships with the device(s) that provide it using respective pTPM(s) in those device(s), as well as with resource devices it uses to provide LCSs using respective pTPM(s) in those resource device(s), and the resource management system then uses subsets of those resource devices to provide an LCS with a vTPM that allows that LCS to establish trust relationships with respective dTPMs in each of the subset of resource devices that provide it. For example, the LCS trust system of the present disclosure may include resource devices including respective resource device pTPMs, and an SCP device including an SCP device pTPM and providing a resource management system with a resource management system vTPM. The resource management system uses the resource management system vTPM to establish a first trust relationship with the SCP device via the SCP device pTPM, and respective second trust relationships with each of the resource devices via their respective resource device pTPMs. The resource management system the uses a subset of the resource devices to provide an LCS that includes an LCS vTPM and that uses the LCS vTPM to establish a respective third trust relationship with each of the subset of the resource devices via their respective resource device pTPMs. As such, a chain of trust is provided for the LCS that is based at least upon the first, respective second, and respective third trust relationships. As discussed below, the systems and methods of the present disclosure allow LCSs to be provided using different subsets of resource devices during its lifetime while dynamically recomposing a TPM hierarchy to maintain a chain of trust that ensures its trusted operation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) trust system, comprising:
a plurality of first resource devices that each include a respective first resource device physical Trusted Platform Module (pTPM);
a first System Control Processor (SCP) device that includes a first SCP device pTPM; and
a resource management system that is provided by the first SCP device, that includes a resource management system virtual Trusted Platform Module (vTPM), and that is configured to:
establish, using the resource management system vTPM, a first trust relationship with the first SCP device via the first SCP device pTPM;
establish, using the resource management system vTPM, a respective second trust relationship with each of the plurality of first resource devices via the respective first resource device pTPM that is included in that first resource device; and
provide, using a first subset of the plurality of first resource devices, a Logically Composed System (LCS) that includes an LCS vTPM and that is configured to:
establish, using the LCS vTPM, a respective third trust relationship with each of the first subset of the plurality of first resource devices via the respective first resource device pTPM in that first resource device in order to provide a first chain of trust for the LCS that is based at least upon:
the first trust relationship established between the resource management system and the first SCP device;
the respective second trust relationships between the resource management system and each of the first subset of the plurality of first resource devices; and
the respective third trust relationship between each of the first subset of the plurality of first resource devices and the LCS.

2. The system of claim 1, further comprising:
a second resource device that includes a second resource device pTPM, that provides the resource management system along with the first SCP device, and that is configured to:
establish, using the second resource device pTPM, a fourth trust relationship with the first SCP device via the first SCP device pTPM, wherein the resource management system is configured to establish the first trust relationship with the first SCP device by establishing, using the resource management system vTPM, a fifth trust relationship with the second resource device via the second resource device pTPM such that the first trust relationship established between the resource management system and the first SCP device is based at least upon:
the fourth trust relationship established between the second resource device and the first SCP device; and
the fifth trust relationship established between the second resource device and the resource management system.

3. The system of claim 1, further comprising:
a respective second SCP device including a respective second SCP device pTPM and coupling each of the first subset of the plurality of first resource devices to the resource management system, wherein each respective second SCP device is configured to:
establish, using the respective second SCP device pTPM in that respective second SCP device, a fourth trust relationship with its first resource device via the respective first resource device pTPM in that first resource device, wherein the resource management system is configured to establish the respective second trust relationship with each of the plurality of first resource devices by establishing, using the resource management system vTPM, a fifth trust relationship with each of the respective second SCP devices via the respective second SCP device pTPM in that respective second SCP device such that each respective second trust relationship established between the resource management system and each of the first subset of the plurality of first resource devices is based at least upon:
the fourth trust relationship established between each respective second SCP device and its first resource device; and
the fifth trust relationship established between each respective second SCP device and the resource management system.

4. The system of claim 1, wherein the resource management system is configured to:
provide, using a second subset of the plurality of first resource devices that is different than the first subset of the plurality of first resource devices, the LCS that is configured to:
establish, using the LCS vTPM, a respective fourth trust relationship with each of the second subset of the plurality of first resource devices via the respective first resource device pTPM in that first resource device in order to provide a second chain of trust for the LCS that is based at least upon:
the first trust relationship established between the resource management system and the first SCP device;

the respective second trust relationships between the resource management system and each of the second subset of the plurality of first resource devices; and the respective fourth trust relationship between each of the second subset of the plurality of first resource devices and the LCS.

5. The system of claim 1, wherein the LCS vTPM includes an LCS vTPM endorsement key generated using at least a first SCP device pTPM endorsement key from the first SCP device pTPM included in the first SCP device, and a respective first resource device pTPM endorsement key from each of the respective first resource device pTPMs included in each of the first subset of the plurality of first resource devices.

6. The system of claim 1, wherein the resource management system vTPM includes a resource management system vTPM endorsement key generated using at least a first SCP device pTPM endorsement key from the first SCP device pTPM included in the first SCP device.

7. An Information Handling System (IHS), comprising:
a processing system; and
a memory system that is coupled to the processing system and that includes instructions that, when executed by the processing system, cause the processing system to provide a resource management engine that is configured to:
establish, using a resource management engine virtual Trusted Platform Module (vTPM) that is included in the resource management engine, a first trust relationship with a first System Control Processor (SCP) device that includes at least a portion of the processing system that provides the resource management engine via a first SCP device physical Trusted Platform Module (pTPM) that is included in the first SCP device;
establish, using the resource management engine vTPM, a respective second trust relationship with each of a plurality of first resource devices via a respective first resource device pTPM that is included in that first resource device; and
provide, using a first subset of the plurality of first resource devices, a Logically Composed System (LCS) that includes an LCS vTPM and that is configured to:
establish, using the LCS vTPM, a respective third trust relationship with each of the first subset of the plurality of first resource devices via the respective first resource device pTPM in that first resource device in order to provide a first chain of trust for the LCS that is based at least upon:
the first trust relationship established between the resource management system and the first SCP device;
the respective second trust relationships between the resource management system and each of the first subset of the plurality of first resource devices; and
the respective third trust relationship between each of the first subset of the plurality of first resource devices and the LCS.

8. The IHS of claim 7, wherein resource management engine is configured to:
establish the first trust relationship with the first SCP device by establishing, using the resource management system vTPM, a fourth trust relationship with a second resource device that includes at least a portion of the processing system that provides the resource management engine via a second resource device pTPM that is included in the second resource device such that the first trust relationship established between the resource management system and the first SCP device is based at least upon:
the fourth trust relationship established between the second resource device and the resource management system; and
a fifth trust relationship established between the second resource device using the second resource device pTPM and the first SCP device using the first SCP device pTPM.

9. The IHS of claim 7, wherein resource management engine is configured to:
establish the respective second trust relationship with each of the plurality of first resource devices by establishing, using the resource management system vTPM, a fourth trust relationship with each of a respective second SCP device including a respective second SCP device pTPM and coupling each of the first subset of the plurality of first resource devices to the resource management engine such that each respective second trust relationship established between the resource management system and each of the first subset of the plurality of first resource devices is based at least upon:
the fourth trust relationship established between each respective second SCP device and the resource management system; and
a fifth trust relationship established between each respective second SCP device using its respective second SCP device pTPM and its first resource device using its first resource device pTPM.

10. The IHS of claim 7, wherein the resource management engine is configured to:
provide, using a second subset of the plurality of first resource devices that is different than the first subset of the plurality of first resource devices, the LCS that is configured to:
establish, using the LCS vTPM, a respective fourth trust relationship with each of the second subset of the plurality of first resource devices via the respective first resource device pTPM in that first resource device in order to provide a second chain of trust for the LCS that is based at least upon:
the first trust relationship established between the resource management system and the first SCP device;
the respective second trust relationships between the resource management system and each of the second subset of the plurality of first resource devices; and
the respective fourth trust relationship between each of the second subset of the plurality of first resource devices and the LCS.

11. The IHS of claim 7, wherein the LCS vTPM includes an LCS vTPM endorsement key generated using at least a first SCP device pTPM endorsement key from the first SCP device pTPM included in the first SCP device, and a respective first resource device pTPM endorsement key from each of the respective first resource device pTPMs included in each of the first subset of the plurality of first resource devices.

12. The IHS of claim 7, wherein the resource management system vTPM includes a resource management system vTPM endorsement key generated using at least a first SCP device pTPM endorsement key from the first SCP device pTPM included in the first SCP device.

13. The IHS of claim 7, wherein LCS vTPM is provided by a processing system pTPM, and wherein the processing system pTPM includes a plurality of processing system Platform Configuration Registers (PCRs) that are configured to store different processing system states, a plurality of LCS vTPM PCRs are that are configured to store different LCS states, and a plurality of combined processing system/LCS PCRs that are configured to storage different states of the processing system and the LCS.

14. A method for providing for trusted operation of a Logically Composed System (LCS), comprising:
   establishing, by a resource management system using a resource management system virtual Trusted Platform Module (vTPM) that is included in the resource management system, a first trust relationship with a first System Control Processor (SCP) device that provides the resource management system via a first SCP device physical Trusted Platform Module (pTPM) that is included in the first SCP device;
   establishing, by the resource management system using the resource management system vTPM, a respective second trust relationship with each of a plurality of first resource devices via a respective first resource device pTPM that is included in that first resource device;
   providing, by the resource management system using a first subset of the plurality of first resource devices, a Logically Composed System (LCS) that includes an LCS vTPM; and
   establishing, by the LCS using the LCS vTPM, a respective third trust relationship with each of the first subset of the plurality of first resource devices via the respective first resource device pTPM in that first resource device in order to provide a first chain of trust for the LCS that is based at least upon:
      the first trust relationship established between the resource management system and the first SCP device;
      the respective second trust relationships between the resource management system and each of the first subset of the plurality of first resource devices; and
      the respective third trust relationship between each of the first subset of the plurality of first resource devices and the LCS.

15. The method of claim 14, further comprising:
   establishing, by the resource management system, the first trust relationship with the first SCP device by establishing, using the resource management system vTPM, a fourth trust relationship with a second resource device that provides the resource management engine via a second resource device pTPM that is included in the second resource device such that the first trust relationship established between the resource management system and the first SCP device is based at least upon:
      the fourth trust relationship established between the second resource device and the resource management system; and
      a fifth trust relationship established between the second resource device using the second resource device pTPM and the first SCP device using the first SCP device pTPM.

16. The method of claim 14, further comprising:
   establishing, by the resource management system, the respective second trust relationship with each of the plurality of first resource devices by establishing, using the resource management system vTPM, a fourth trust relationship with each of a respective second SCP device including a respective second SCP device pTPM and coupling each of the first subset of the plurality of first resource devices to the resource management engine such that each respective second trust relationship established between the resource management system and each of the first subset of the plurality of first resource devices is based at least upon:
      the fourth trust relationship established between each respective second SCP device and the resource management system; and
      a fifth trust relationship established between each respective second SCP device using its respective second SCP device pTPM and its first resource device using its first resource device pTPM.

17. The method of claim 14, further comprising:
   providing, by the resource management system using a second subset of the plurality of first resource devices that is different than the first subset of the plurality of first resource devices, the LCS;
   establish, by the LCS using the LCS vTPM, a respective fourth trust relationship with each of the second subset of the plurality of first resource devices via the respective first resource device pTPM in that first resource device in order to provide a second chain of trust for the LCS that is based at least upon:
      the first trust relationship established between the resource management system and the first SCP device;
      the respective second trust relationships between the resource management system and each of the second subset of the plurality of first resource devices; and
      the respective fourth trust relationship between each of the second subset of the plurality of first resource devices and the LCS.

18. The method of claim 14, wherein the LCS vTPM includes an LCS vTPM endorsement key generated using at least a first SCP device pTPM endorsement key from the first SCP device pTPM included in the first SCP device, and a respective first resource device pTPM endorsement key from each of the respective first resource device pTPMs included in each of the first subset of the plurality of first resource devices.

19. The method of claim 14, wherein the resource management system vTPM includes a resource management system vTPM endorsement key generated using at least a first SCP device pTPM endorsement key from the first SCP device pTPM included in the first SCP device.

20. The method of claim 14, wherein LCS vTPM is provided by a processing system pTPM, and wherein the processing system pTPM includes a plurality of processing system Platform Configuration Registers (PCRs) that are configured to store different processing system states, a plurality of LCS vTPM PCRs are that are configured to store different LCS states, and a plurality of combined processing system/LCS PCRs that are configured to storage different states of the processing system and the LCS.

* * * * *